United States Patent [19]

Ferran et al.

[11] Patent Number: 4,720,807
[45] Date of Patent: Jan. 19, 1988

[54] ADAPTIVE PRESSURE CONTROL SYSTEM

[75] Inventors: Robert J. Ferran, LaJolla, Calif.; Anthony J. Tessicini, Norwell; Timothy R. Brown, Westboro, both of Mass.

[73] Assignee: Vacuum General, Inc., San Diego, Calif.

[21] Appl. No.: 736,224

[22] Filed: May 20, 1985

[51] Int. Cl.[4] ............ F16K 31/12; G01N 7/00; G01N 9/00; G06G 7/57
[52] U.S. Cl. ............ 364/558; 346/33 TP; 364/509; 364/510; 137/487.5
[58] Field of Search ............ 364/558, 510; 137/487.5, 624.11; 346/33 TP

[56] References Cited

U.S. PATENT DOCUMENTS

| | | | |
|---|---|---|---|
| 3,665,945 | 5/1972 | Ottenstein | 364/558 |
| 3,952,759 | 4/1986 | Ottenstein | 364/558 |
| 4,412,552 | 11/1983 | Kolbanovsky | 137/487.5 |
| 4,436,110 | 3/1984 | Leeuwma et al. | 137/487.5 |
| 4,481,967 | 11/1984 | Frick | 137/487.5 |
| 4,550,747 | 11/1985 | Woodworth et al. | 137/487.5 |
| 4,569,012 | 2/1986 | Sekozawa et al. | 364/810 |
| 4,597,405 | 7/1986 | Oetiker et al. | 137/487.5 |

OTHER PUBLICATIONS

Automatic Control Engineering, Francis H. Raven, McGraw-Hill Book Co., 1968, Chapter 14, pp. 453–491.

Primary Examiner—Felix D. Gruber
Assistant Examiner—Danielle Laibowitz
Attorney, Agent, or Firm—Knobbe, Martens, Olson & Bear

[57] ABSTRACT

An apparatus and method control the pressure in a system by continuously measuring the pressure and comparing it to a desired set pressure. The apparatus and method record a history of the measured pressure as a function of time and calculate the rates at which the pressure changes. The rates at which the pressure changes are recorded and the rate at which the rates change is also calculated to determine the rate at which the apparatus and method can vary the rate of change of pressure. The apparatus and method calculate the amount of time required to reach the desired set pressure and compare it to the amount of time required for the rate of change of the pressure to become zero and adjust the flow of a gas in the system so that the desired set pressure is achieved at substantially the same time as the rate of pressure change becomes zero.

14 Claims, 22 Drawing Figures

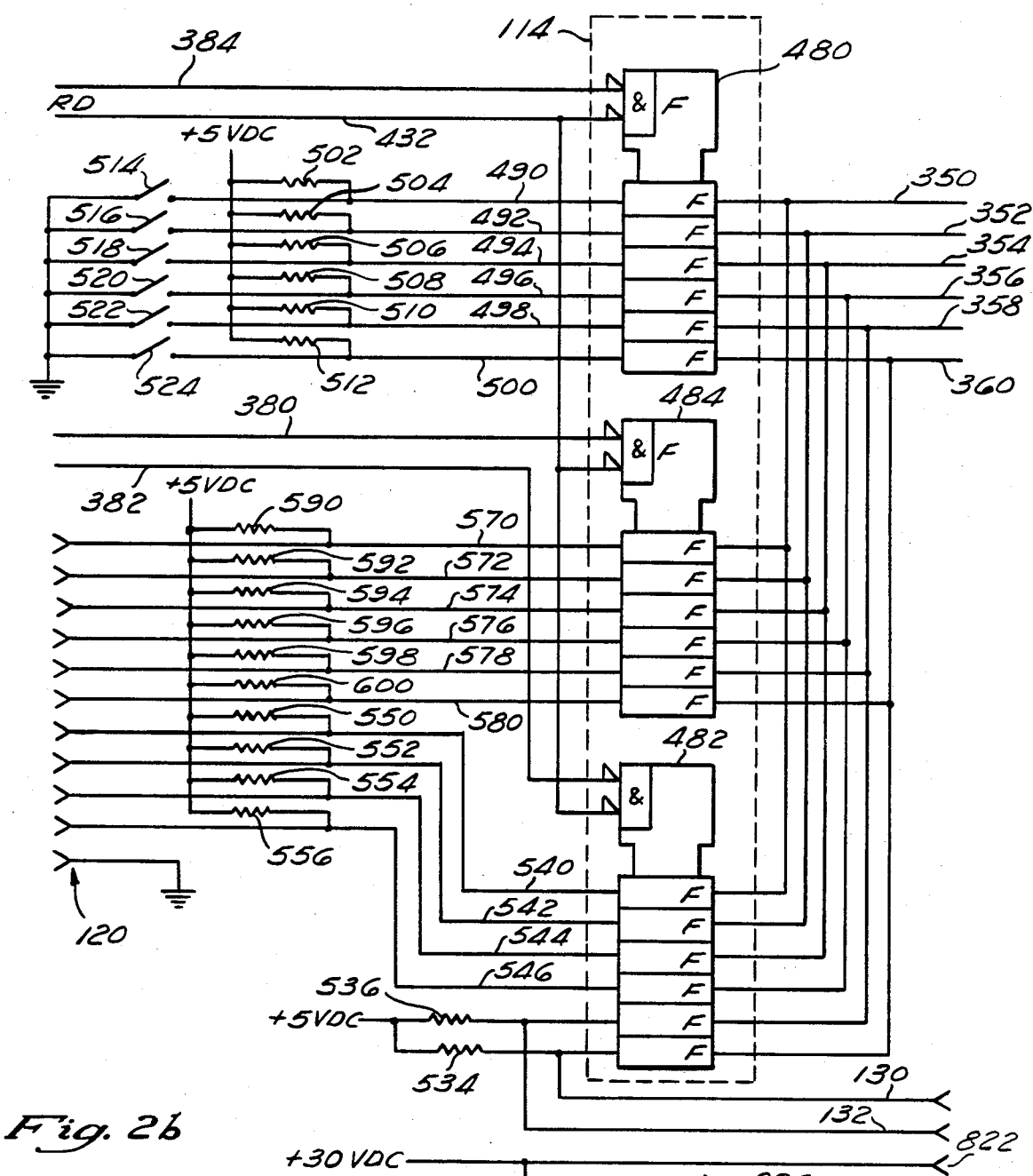
Fig. 2b
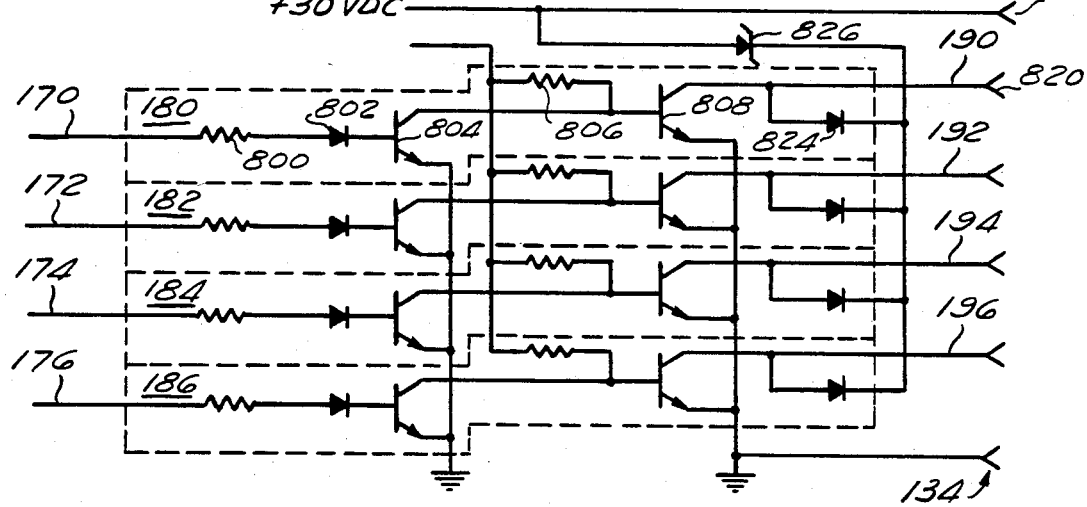

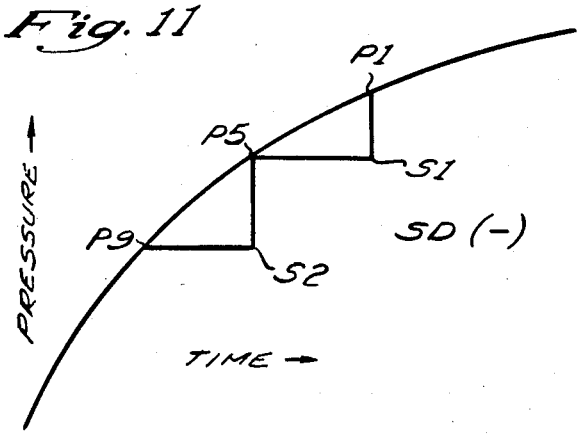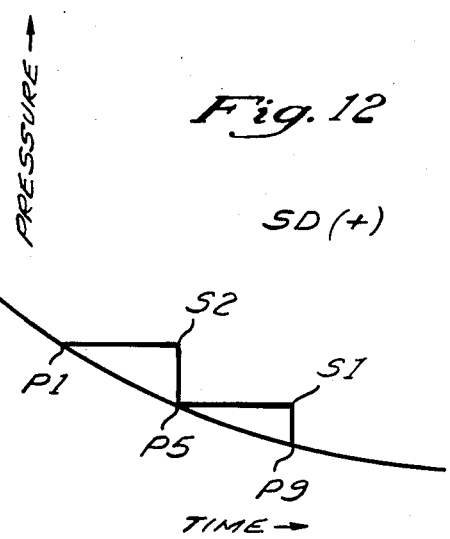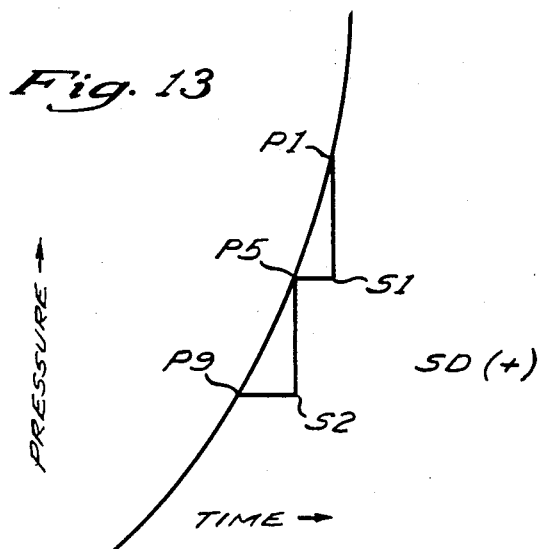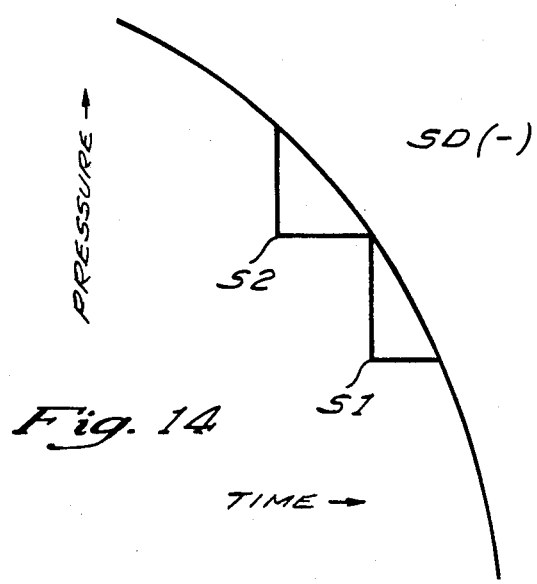

ADAPTIVE PRESSURE CONTROL SYSTEM

FIELD OF THE INVENTION

This invention relates generally to control systems, and specifically, to systems for use in the adaptive control of pressure.

BACKGROUND OF THE INVENTION

In parameter control systems, such as those used for controlling pressure in an industrial process, the control system monitors the magnitude of an input parameter (e.g., pressure) and tries to maintain the input parameter within an acceptable range of a desired magnitude of that parameter. Since the controlled parameter is affected by other environmental factors (e.g., temperature, material inputs to the processor, etc.), it is necessary for the control system to respond to the changes caused by these factors in order to maintain the parameter within the desired range of magnitude. Furthermore, the desired range of magnitude of the parameter can change during a process to a new desired range. If this occurs, the control system must be able to bring the input parameter to a magnitude within the desired range and hold it at that magnitude. A control system must be able to perform its control functions with a fast response time, with a minimum of overshoot (or undershoot), without hunting to achieve the new desired magnitude, and without surging in response to changes in the system.

In typical prior art systems, a number of factors determine how well the systems maintain the controlled parameter at a desired magnitude and how well the systems respond to changes in the process which they are controlling. Most systems have adjustments for the gain of the system which determines the magnitude of the response of the system to error signals (i.e., the difference between the desired magnitude of the controlled parameter and the measured magnitude of the controlled parameter). A typical control system also has adjustments for the amount of phase lag between changes in the parameter being controlled and the output signal to a device, such as a valve, which controls the parameter. The phase lag provides an integrating factor which causes the system to be more responsive to changes in the measured parameter. Many control systems also include an adjustment for phase lead or differentiation which allows the control system to anticipate when the magnitude of the controlled parameter is going to be within an acceptable range of the desired magnitude, and thus act to change the control signals to the controlling device so that overshoot (or undershoot) of the desired magnitude is avoided.

Many prior art systems having the capabilities discussed above can be adjusted to provide accurate control of the controlled parameter. However, the adjustments which may be optimal for one range of magnitudes of the controlled parameter are typically not optimal for other ranges. Thus, if the desired magnitude of the controlled parameter changes during the process (e.g., if the first segment of a process is performed at one pressure level and second and subsequent segments are performed at different pressure levels), then the operator must make new adjustments to maintain optimal performance of the control system.

The adjustments described above are typically dependent upon system characteristics which can change with time. For example, in a pressure control system, a pump which causes the flow of a gas or other fluid into or out of the process chamber can vary in performance over time. Although the adjustments in the gain, phase lag and phase lead may provide optimal performance initially, changes in the characteristics of the system require that the adjustments be varied repeatedly to maintain optimal performance of the control system. Furthermore, a means must be provided to determine what the new characteristics are in order to determine what the adjustments to the gain, phase lag and phase lead should be. This can be accomplished by testing the system being controlled and measuring its response at various magnitudes of the controlled parameter and then calculating the adjustments required to optimize the performance. This is sometimes done prior to operating the system so that the information pertaining to the response characteristics at various magnitudes is available for making the adjustments required during the process.

Some control systems are available which are responsive to changes in the characteristics of the controlled system which may occur after a process is started. These control systems typically use the technique of periodically introducing a disturbance to the controlled system so that the ability of the control system to effect changes in the controlled parameter can be measured and the results of the measurements used to optimize the settings of the gain, phase lead and phase lag. However, inherent in this technique is the disturbance of an operating system. Rather than continuously driving the controlled parameter towards the desired magnitude of the parameter, the disturbance systems periodically drive the controlled parameter away from the desired magnitude. Many processes are sensitive to the controlled parameter and cannot tolerate the temporary changes introduced by the disturbance techniques.

Control systems such as those described above are typically adjusted for a limited range of process system configurations. If the control system is used on a different process system, the control system must be readjusted for the physical parameters of the different process system. For example, the characteristics of a process system having a vacuum chamber of one volume will have substantially different characteristics than a process system with a significantly larger or significantly smaller vacuum chamber. A typical prior art control system is not readily useable for controlling a different process system without requiring adjustments to its gain, phase lag and phase lead characteristics.

A need thus exists for a control system which does not require operator input to adjust the control system for optimal control of a parameter. The control system should automatically compensate for changes in the desired magnitude of the controlled parameter and should also compensate for changes in the characteristics of the process which is being controlled, including changes in the physical parameters of the system in which the process is occurring. The control system should accomplish the foregoing without introducing any disturbances to the process which is being controlled.

SUMMARY OF THE INVENTION

The present invention is a control system which provides adaptive control of a parameter in a controlled system such as an industrial process. The present invention requires only a single input which is proportional to the current magnitude of the parameter to be controlled. The present invention compares the current magnitude of the parameter with a desired magnitude of the parameter and provides output control signals to regulate the flow of a parameter-affecting species. In a preferred embodiment of the present invention, the controlled parameter is the pressure in a vacuum chamber and the parameter-affecting species is the flow of gas from the chamber. Unlike the prior art systems discussed above, the present invention requires no operator input or other input to adjust the gain, phase lead, phase lag or any other characteristics of the system. Furthermore, the present invention maintains a history of the responses of the controlled parameter to the control signals generated by the present invention and continuously calculates the ability of the present invention to control the parameter.

The present invention maintains the history of the responses based solely upon the signals which it generates to maintain the controlled parameter at a desired magnitude or to change the controlled parameter from one desired magnitude to a new desired magnitude. Thus, unlike the other control systems known to the art, the present invention does not have to disturb the system which it is controlling and does not introduce any unnecessary changes to the controlled system which can affect the process occurring in the controlled system.

The present invention is particularly advantageous in that the physical parameters of the controlled system do not have to be known by the present invention in order to control the controlled parameter in the controlled system. All the information which the present invention requires in order to effectively control the controlled parameter is developed by the present invention as it generates control signals to the controlled system and measures the responses of the controlled parameter to the controlled signals.

The present invention is a system which periodically measures the magnitude of a controlled parameter, such as a gas. The measured magnitude of the parameter is recorded and a history of the measured magnitude of the parameter is maintained. The measured magnitude is compared with a set desired magnitude and the difference between the measured magnitude and the desired magnitude is calculated. The amount of time between changes in the measured magnitude of the parameter is measured and used to determine the rate of change in magnitude with respect to time. The rates of changes of magnitude are stored for further use. Based upon the current rate of change of magnitude with respect to time, and the difference between the current magnitude and the desired magnitude, a time is calculated to determine when the desired magnitude will be reached based upon the current rate of change of magnitude.

The system also calculates the rate at which the rate of change of magnitude is changing by calculating the difference between the current rate of change of magnitude and a previously recorded rate of change of magnitude and dividing by the amount of time elapsed between the two recorded rates of change of magnitude. The system of the present invention then calculates how long it would take to change the rate of change of magnitude to zero based upon the calculated rate at which the rate of change of magnitude can be changed. The system then compares the amount of time required to reach the desired magnitude at the current rate of change of magnitude with the amount of time required to change the rate of change of magnitude to zero. If the amount of time required to reach the desired pressure is less than the amount of time required to change the rate of change of magnitude to zero, then a regulator which regulates the flow of the parameter-affecting species is adjusted so that the rate at which the rate of change of the magnitude of the parameter is changing is increased to thereby prevent overshooting of the desired magnitude. Conversely, if it is determined that the rate of change of the magnitude will become zero in less time than that required for the magnitude to reach the desired magnitude, then the regulator is adjusted so that the rate at which the rate of change of magnitude is changing is decreased. The foregoing steps are repeated continuously to maintain a history of the ability of the system to respond to changes in the magnitude of the parameter. The history of changes is thus used to make decisions in the control of the regulator. Thus, the method of the present invention continuously adapts to the ability of the system to respond to changes in the magnitude of the parameter. Unlike the disturbance systems which periodically drive the parameter away from the desired parameter, the present invention develops a history of the response of the system only while driving the parameter towards the desired parameter.

The controlled parameter is the pressure in a vacuum chamber. The parameter-affecting species is the gas which is evacuated from the chamber and the regulator is a throttle valve. The apparatus of the preferred embodiment of the invention includes an analog-to-digital converter which converts pressure input information to digital data. A microprocessor is programmed to respond to the digital data from the analog-to-digital converter and calculate the difference between the current pressure and the desired pressure. The microprocessor includes data storage memory to maintain a history of the pressure changes. The microprocessor calculates the rate at which the pressure changes. The microprocessor maintains a history of the rates at which the pressure changes and calculates the rate at which the system can change the rate of pressure changes. The control system is thus able to determine whether a throttle valve should be opened or closed to change the rate of change of pressure so that the desired pressure is reached at the same time as the rate of change of pressure is substantially equal to zero. Thus, the apparatus of the present invention significantly reduces the overshoot of the desired pressure.

BRIEF DESCRIPTION OF THE DRAWINGS

FIGS. 2a, 2b, 2c and 2d are detailed schematic diagrams of the apparatus of the present invention.

FIGS. 11, 12, 13, and 14 are graphical representations of exemplary pressure waveforms versus time.

DETAILED DESCRIPTION OF THE PREFERRED EMBODIMENT

Figure 1:
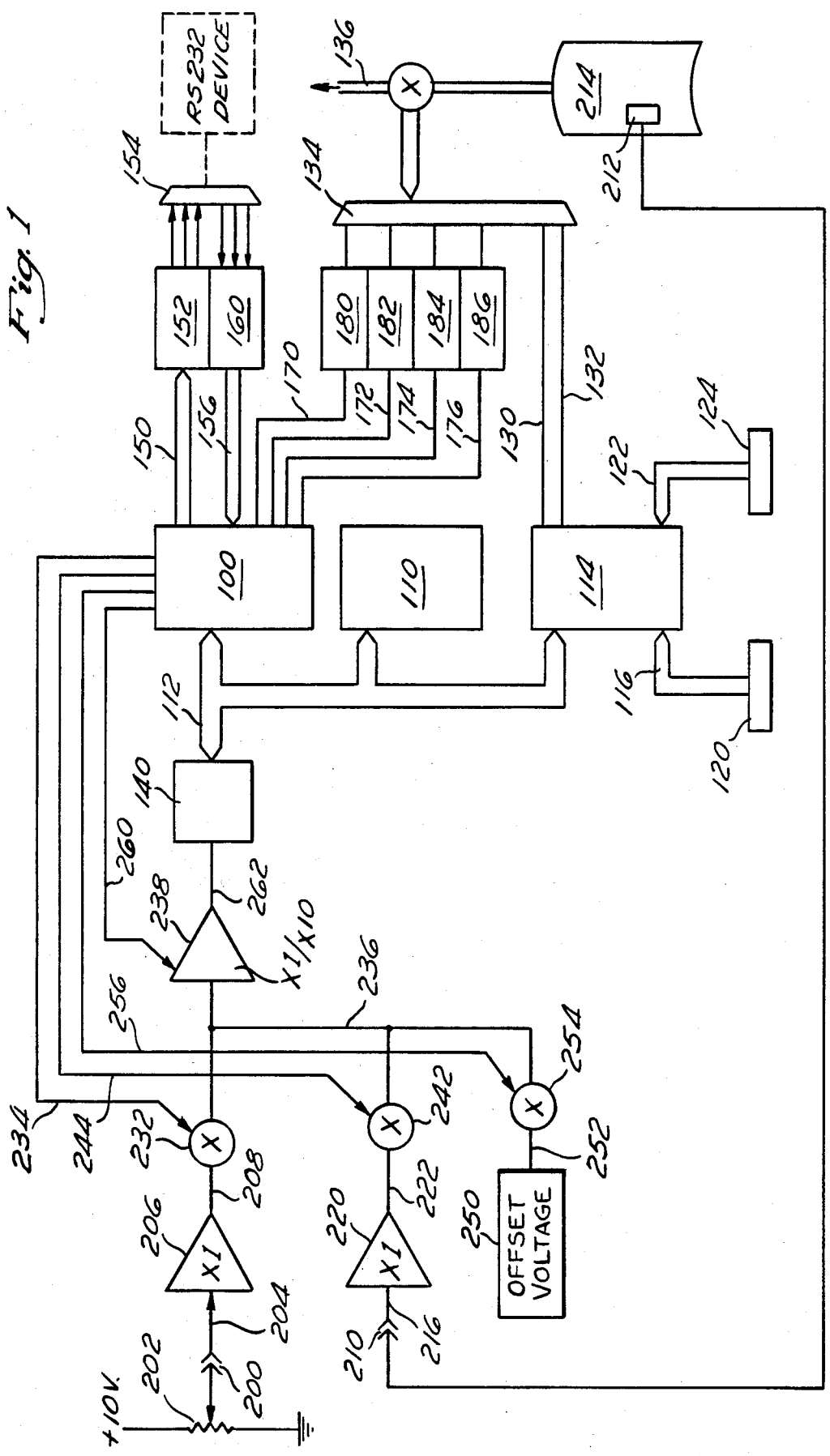
FIG. 1 is a block diagram of the apparatus of the present invention.

FIG. 1 illustrates a block diagram of the preferred embodiment of the apparatus of the present invention. The apparatus comprises a central processing unit (CPU) 100, such as a microprocessor. In the preferred embodiment, the CPU 100 is an Intel P8031 microprocessor having an internal random access read/write memory (RAM), programmable input/output ports, and a programmable serial port for full duplex communication. The CPU 100 executes various programs which cause the CPU 100 to monitor various input signals and to generate output signals to control the apparatus, as will be described below.

The apparatus further includes a programmable read only memory (PROM) 110, connected to the CPU 100, which provides permanent storage for the control programs and algorithms which control the CPU 100. The PROM 110 is connected to the CPU 100 via a parallel data bus 112. The parallel data bus 112 is used to communicate address information from the CPU 100 to the PROM 110 and to communicate data information from the PROM 110 to the CPU 100.

The parallel data bus 112 is also connected to a set of bus drivers 114. The bus drivers 114 generate output signals on the bus 112 when enabled by the CPU 100. The bus drivers 114 are not enabled when the PROM 110 is enabled. Ten of the bus drivers 114 have a first set of inputs 116 which are connected to a logic connector 120. The logic connector 120 is connectable to a source (not shown) of TTL compatible input signals (i.e., signals having voltage levels which vary from zero to +5 volts). The source of the signals on the logic connector 120 can vary the voltage levels of the signals to convey information or commands to the CPU 100.

Six of the bus drivers 114 are connected to a set of lines 122 from an RS232 configurator 124. The RS232 configurator 124 comprises a set of six static signals which can be selectively set at high logic levels or low logic levels. Preferably, the RS232 configurator includes a set of switches (not shown) which can be opened or closed to select the levels. Alternatively, the signal levels can be selected by using jumper wires between locations on a printed circuit board.

Two of the bus drivers 114 are connected to a pair of lines 130 and 132 which are connected to an electrical connector 134. The electrical connector 134 is connectable to an electrically controlled throttle valve 136 which controls the flow of a fluid, such as a gas. The throttle valve 136 has two output signals, 0 degrees and 90 degrees, which are connectable to the lines 130 and 132, respectively, via the connector 134. The 0-degree signal on the line 130 is active when the throttle valve 136 is fully closed and the 90-degree signal on the line 132 is active when the throttle valve 136 is fully closed. Thus, the CPU 100 can determine whether the throttle valve 136 is fully open or fully closed by activating the line drivers 114 and examining the signals on the bus 112 corresponding to the two output signals on the lines 130 and 132.

The parallel data bus 112 is further connected to an analog-to-digital converter (ADC) 140. The ADC 140 receives commands from the CPU 100 on the parallel data bus 112 and generates digital data outputs on the parallel data bus 112 which are responsive to the magnitude of an analog voltage on an input to the ADC 140.

The CPU 100 generates output signals on a data bus 150 which is connected to the inputs of a set of RS232 line drivers 152. The outputs of the line drivers 152 are connected to a standard RS232 connector 154. The signals on the data bus 150 include a serial output signal for transmitting data from the CPU 100 to a modem, a computer or the like. The data bus 150 also includes control signals which can be used for controlling the transmission of data. In the exemplary embodiment, the CPU 100 acts as an RS232 listening device and generates the RS232 signals DATA TERMINAL READY and CLEAR TO SEND on the data bus 150. THe CPU 100 receives input signals on a data bus 156 which is connected to the outputs of a set of RS232 compatible receivers 160. The inputs of the receivers 160 are connected to the RS232 connector 154. One of the receivers 160 converts an RS232 compatible serial signal to voltage levels compatible with the input to the CPU 100. Others of the receivers 160 convert RS232 compatible control signals (i.e., DATA SET READY and REQUEST TO SEND) to voltage levels compatible with the CPU 100. The CPU 100 can alternatively be configured as a talking device by interchanging the interconnections from the RS232 connector 154 to the line drivers 152 and line receivers 160.

The CPU 100 has a set of output lines 170, 172, 174, and 176 which are connected to the inputs of a set of motor drivers 180, 182, 184, and 186, respectively. The outputs of the motor drivers 180, 182, 184, and 186, are connected via a set of lines 190, 192, 194, and 196 to the electrical connector 134. As set forth above, the electrical connector 134 is connected to the throttle valve 136. The throttle valve 136 is preferably operated by a conventional stepper motor (not shown). The stepper motor has a set of phase windings which can be driven in sequence to cause the stepper motor to rotate in one of two rotational directions in incremental steps. Rotation of the stepper motor in one of the two directions causes the throttle valve 136 to open, and rotation of the stepper motor in the other of the two directions causes the throttle valve 136 to close. The amount of opening and closing is determined by the number of steps by which the stepper motor is driven. The outputs of the motor drivers 180, 182, 184, and 186 on the lines 190, 192, 194, and 196 are connected to the phase windings of the stepper motor of the throttle valve 136. The CPU 100 generates output signals on the lines 170, 172, 174, and 176 in proper phase relationships to activate the motor drivers 180, 182, 184, and 186 in sequence to drive the stepper motor in either one of the two rotational directions.

The apparatus further includes an analog set point connector 200 which is connectable to a source of a positive DC voltage which can be varied from zero volts to +10 volts. The source of DC voltage can be a potentiometer 202 which is calibrated so that the voltage levels correspond to selected pressures. Alternatively, the source of DC voltage can be the output of an digital-to-analog converter (not shown) or another source of analog data representative of a selected pressure. The connector 200 is connected via a line 204 to an operational amplifier 206. The operational amplifier 206 has a gain of −1. Thus, the output of the operational amplifier 206 on a line 208 will have the same magnitude as the input to the operational amplifier 206.

The output of the operational amplifier 206 is connected via the line 208 to an electrically controlled switch 232. The switch 232 is preferably a junction field effect transistor (JFET) or other semiconductor device having a low resistance when it is enabled. The switch 232 is selectively enabled and disabled by an output of the CPU 100 via a line 234. The switch 232 in the preferred embodiment includes circuitry to convert the voltage levels on the line 234 from the CPU 100 to the voltage levels required to enable and disable the JFET. When the switch 232 is enabled, it provides a low resistance path from the output of the operational amplifier 206 on the line 208 to a line 236. When the switch 232 is disabled, the output of the operational amplifier 206 is disconnected from the line 236. The line 236 is connected to the input of an operational amplifier 238.

The apparatus further includes a pressure input connector 210 which is connected to a pressure transducer 212, which is preferably a capacitive manometer. The transducer 212 is mounted on a chamber 214 or other enclosure in which the pressure is to be measured and controlled. The transducer 212 preferably generates a DC voltage which ranges from zero to +10 volts in proportion to the pressure in the chamber 214. For example, if the chamber 214 is a vacuum chamber, the transducer 212 may be calibrated to provide an output voltage of zero volts if the pressure in the chamber 214 is zero torr and 10 volts if the pressure is 100 torr. Thus, if the chamber 214 is at one-tenth atmosphere of pressure (i.e., 76 torr), the output of the transducer 212 would be 7.6 volts. If a smaller range of pressures are to be measured, the transducer 212 is advantageously selected to provide an output voltage of 10 volts for the maximum pressure of the range. For example, if the chamber 214 operates in the range of zero to 10 torr, the transducer 212 will generate an output voltage which changes by one volt for each one torr change in pressure. In this example, the voltage of 7.6 volts would correspond to a pressure of 7.6 torr.

The connector 210 is connected via a line 216 to a second operational amplifier 220. The operational amplifier 220 is advantageously connected to provide a gain of −1 from its input to its output. Thus, the voltage on the output of the operational amplifier 220 on a line 222 will be the same magnitude as the voltage on the input to the operational amplifier 220.

The output of the operational amplifier 220 is connected via the line 222 to an electrically controlled switch 242. The switch 242 is preferably a junction field effect transistor (JFET) or other semiconductor device having a low resistance when it is enabled. The switch 242 is selectively enabled and disabled by an output of the CPU 100 via a line 244. The switch 242 in the preferred embodiment includes circuitry to convert the voltage levels on the line 244 from the CPU 100 to the voltage levels required to enable and disable the JFET. When the switch 242 is enabled, it provides a low resistance path from the output of the operational amplifier 220 on the line 222 to a line 236. When the switch 242 is disabled, the output of the operational amplifier 220 on the line 222 is disconnected from the line 236.

The switches 232 and 242 are not enabled at the same time. Thus, either the output of the operational amplifier 206 or the output of the operational amplifier 220 can be connected to the line 236, and thus to the input to the operational amplifier 238.

In the preferred embodiment, the apparatus further includes an offset voltage source 250. The offset voltage source 250 preferably provides an output voltage on a line 252 which has a magnitude of approximately 0.5 volts, with respect to a ground reference, which is 5 percent of the full scale range of the transducer 212. The line 252 is connected to a switch 254 which is preferably a JFET, as described above. The switch 254 is selectively enabled and disabled by the CPU 100 via a line 256. The switch 254 is also connected to the line 236 and thus to the input of the operational amplifier 238. When the switch 254 is enabled by the CPU 100, the magnitude of the offset voltage from the voltage source 250 is added to the magnitude of either the voltage output of the operational amplifier 206 or the magnitude of the voltage output of the operational amplifier 220, if either the switch 232 or the switch 242 is enabled. The sum of the two voltages is thus provided as the input to the operational amplifier 230. If neither the switch 232 nor the switch 242 is enabled, the magnitude of the offset voltage is provided as an input to the operational amplifier 238.

The purpose of the offset voltage source 250 is to provide compensation for the analog input voltage on the connector 200 or the analog input voltage on the connector 210 if either of the voltages drifts into a negative voltage range. The magnitude of the offset voltage source is selectively added to the magnitude of the output of the operational amplifier 206 or to the magnitude of the output of the operational amplifier 220 to compensate for the negative voltage. In practice, the input voltages do not drift more than 0.5 volts below zero volts. Thus, the offset voltage of 0.5 volts is sufficient to compensate for voltage drift within the expected range.

The operational amplifier 238 has a selectable gain of either −1 or −10. The selection of the gain is controlled by the CPU 100 via a line 260. The CPU 100 can generate one of two logic levels on the line 260. When the line 260 is at one logic level, the gain of the operational amplifier 238 is −1, and when the line 260 is at the other logic level, the gain of the operational amplifier 238 is −10. When the voltage on the input to the operational amplifier 238 on the line 236 is varying between zero and −10 volts, the CPU 100 generates the appropriate logic level on the line 260 to select the gain of −1 so that the output of the operational amplifier 238 on a line 262 will have the same magnitude as the voltage on the input to the operational amplifier 238 on the line 236. If the voltage on the line 236 is varying between zero volts and −1 volt, the CPU 100 can advantageously generate the logic level on the line 260 to select the gain of −10. Thus, the output of the operational amplifier 238 will vary between zero and +10 volts to provide a better resolution of the input signal.

The line 262 connects the output of the operational amplifier 238 to the analog input of the ADC 140. The ADC 140 converts the magnitude of the analog input on the line 262 to a binary digital output on the parallel data bus 112. In the preferred embodiment, the ADC 140 converts the analog input to a 12-bit binary representation of the magnitude of the analog input. The binary output of the ADC 140 is placed on the bus 112 in an 8-bit segment and then in a 4-bit segment upon command by the CPU 100. The switches 232, 242, and 254 are activated in sequence by the CPU 100 so that the binary digital outputs of the ADC 140 correspond to the analog set point input on the connector 200, the pressure transducer input on the connector 210, and the offset voltage from the offset voltage source 250, respectively. As set forth above, the switch 254 can be activated in combination with either the switch 232 or the switch 242 so that the magnitude of the offset voltage is added to the analog set point input or the pressure transducer input, respectively. Thus, the ADC 140 is provided with positive DC voltages only on its input. The binary digital output of the ADC 140 is thus an unsigned binary representation of the selected analog voltage and always represents a positive voltage in the preferred embodiment.

FIGS. 2a, 2b, 2c, and 2d illustrate the detailed interconnections between the components of the preferred embodiment. Like numerical designators in FIGS. 2a–d correspond to the elements of FIG. 1, as described above.

Figure 2A:
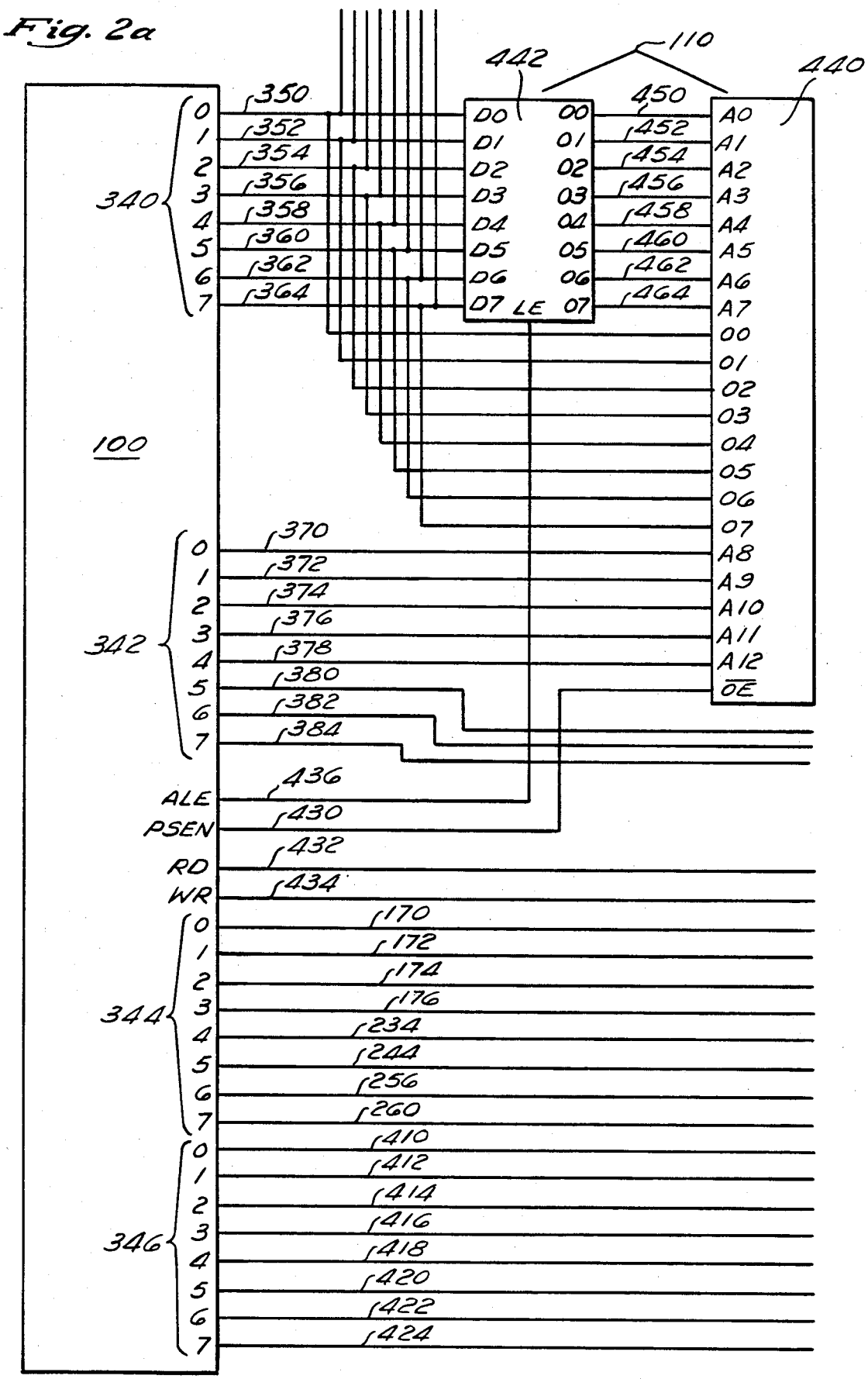

In FIG. 2a, the CPU 100 is shown as an 8031 microcomputer available from Intel, and other sources. The CPU 100 has four bidirectional 8-bit data ports 340, 342, 344, and 346 which are independently controllable by the CPU 100. The data port 340 is connected to lines 350, 352, 354, 356, 358, 360, 362, and 364 which comprise the parallel data bus 112. The data port 342 is connected to the lines 370, 372, 374, 376, 380, 382 and 384. The data port 344 is connected to lines 170, 172, 174, 176, 234, 244, 256, and 260. The data port 346 is connected to lines 410, 412, 414, 416, 418, 420, 422, and 424 which comprise the bus 150.

The CPU 100 also has a program store enable (PSEN) output line 430 which is activated by the CPU 100 when it is accessing the external program stored in the PROM 112. The CPU 100 has an output on a read (RD) line 432 which is activated when the CPU 100 requests data input from an external device connected to one of the data ports 340, 342, 344, and 346. The CPU 100 has an output on a write (WR) line 434 which is activated when the CPU 100 sends data to a device connected to one of the data ports 340, 342, 344, and 346. The CPU 100 has an output on an address latch enable (ALE) line 436 which is activated when the CPU 100 has data on the lines 350, 352, 354, 356, 358, 360, 362, and 264 which are addresses for the PROM 112 or commands for the ADC 140.

The PROM 112 in the preferred embodiment, also shown in FIG. 2a, comprises 8192-word by 8-bit programmable read only memory 440, such as a 2764, available from Intel, or the like, and an eight-bit latch 442, such as a G74SC373, available from GTE, Microcircuits, or the like. When the CPU 100 activates the ALE line 436, the data on the lines are stored in a latching circuit 442. The latching circuit 442 has eight outputs on lines 450, 452, 454, 456, 458, 460, 462, and 464 which are connected to the least significant eight address inputs of the memory 440. Thus, the least significant eight address bits which the CPU 100 generated on the data lines 350, 352, 354, 356, 358, 360, 362, and 364 are saved for subsequent accesses to the memory 440. The memory 440 has five address lines which are connected to the lines 370, 372, 374, 376 and 378, of the port 342. When the CPU 100 accesses the PROM 112, the most significant program memory addresses are activated on the lines 370, 372, 374, 376 and 378. Further information regarding the operation of the CPU 100 and the PROM 112 can be obtained by referring to the 1984 Microcontroller Handbook, available from Intel Corportation; the data sheets for the 2764 programmable read only memory, available from Intel Corporation; and the G74SC373 latch, available from GTE Microcircuits. The contents of the foregoing references are hereby incorporated herein by reference.

Figure 2C:
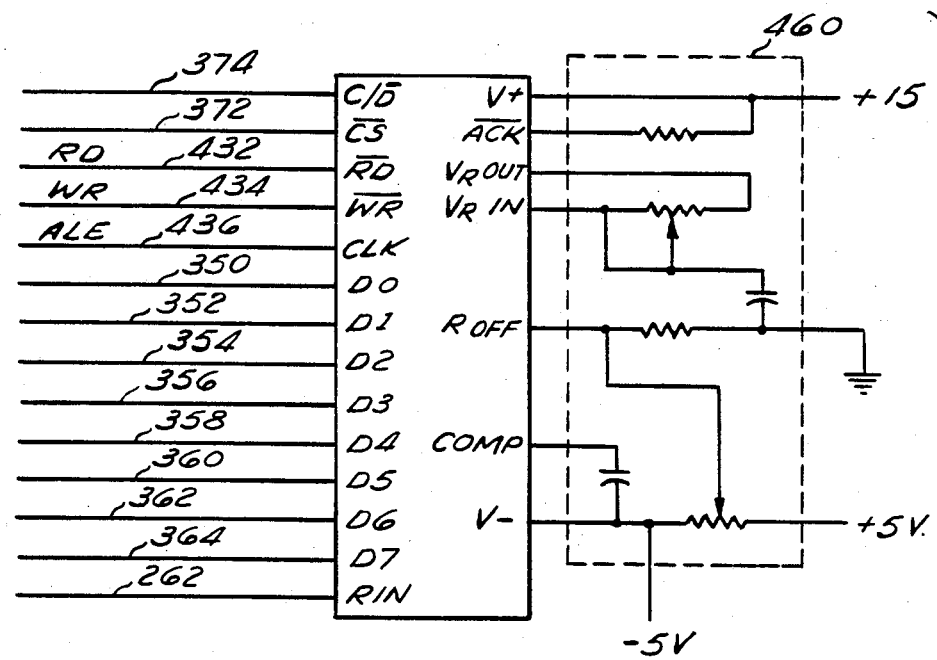
Figure 2C:
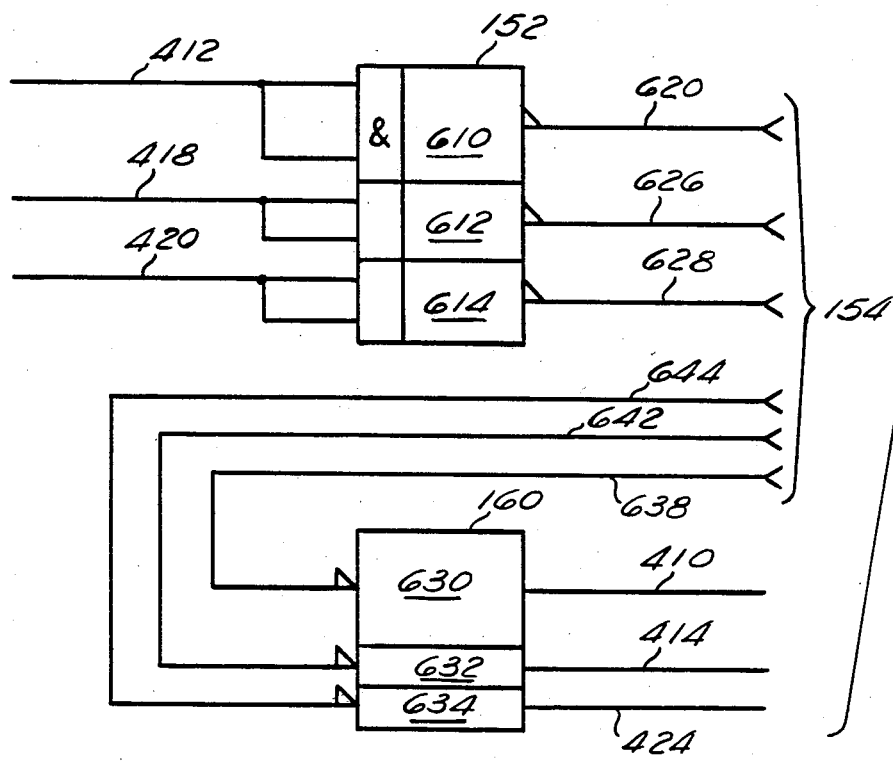

The ADC 140, shown in FIG. 2c, is preferably an Am6112 analog-to-digital converter, available from Advanced Micro Devices, or the like. The ADC 140 receives an analog input on the line 262. The lines 372 and 374 from the data port 342 are connected to a chip select input (CS) and a command/data input (C/D), respectively, of the ADC 140. The ALE line 436 is connected to the clock input (CLK) of the ADC 140, and the RD line 432 and the WR line 434 are connected to the read input (RD) and the write (WR) input, respectively, of the ADC 140.

When the line 372 is activated and the ALE line 436 is activated, the ADC 140 will respond to the CPU 100 in a manner determined by the signal level on the line 374 and the signal levels on the WR line 434 and the RD line 432. If the signal level on the line 374 is high, the ADC 140 will input a command from the CPU 100 if the WR line 434 is active. If the signal level on the line 374 is low and the RD line 432 is active, the ADC is in the data mode and will put the least significant bits of data on the eight data lines 350, 352, 354, 356, 358, 360, 362, and 364. The ADC 140 will put the four most significant bits on the data lines 350, 352, 354, 356 when the RD line 432 is active and the line 374 is high. The ADC 140 also includes external components 460 which are used to bias the ADC 140 for proper operation. The operation of the ADC 140 is fully described in the specification sheets for the Am6112, available from Advanced Micro Devices, and the contents of the specification sheets are hereby incorporated herein by reference.

The bus drivers 114, shown in detail in FIG. 2b, comprise three 6-bit tri-state bus drivers 480, 482, and 484. Each of the tri-state bus drivers 480, 482, 484 has a pair of enable lines which are active when they are at low logic levels. One of the enable inputs from each of the drivers 480, 482 and 484 is connected to the RD line 432. The bus driver 480 has its other enable input connected to the line 384 of the data port 342. The bus driver 480 has six inputs on six lines 490, 492, 494, 496, 498, 500 which are connected to first leads of six pullup resistors 502, 504, 506, 508, 510 and 512 and to first contacts of six single-pole, single-throw switches 514, 515, 518, 520, 522, and 524. The six pullup resistors have second leads which are connected to the positive DC logic voltage and the six switches have second contacts which are connected to logic ground. The operation of the switches 514–524 determine whether the voltage levels on the inputs to the bus driver 480 are at logic high or logic low levels.

The outputs of the bus driver 480 are connected to the six lines 350–360 which comprise the data port 340. When the bus driver 480 is enabled by activating the RD line 432 and the line 384, the logic levels on the inputs to the bus driver 480, as determined by the switches 514–524, are transferred to the CPU 100 on the lines 350–360. The CPU 100 is advantageously programmed to recognize the logic levels thus transferred as configuration information for determining the data rate, parity selection, and start and stop bit selection of the serial input and output of the CPU 100.

The second enable lines of the bus drivers 482 and 484 are connected to the lines 382 and 380, respectively, of the port 342. Two of the inputs to the bus driver 482 are connected via lines 130 and 132, to first leads of pullup resistors 534 and 536 and to the connector 134. As set forth above in connection with FIG. 1, the connector 134 is connected to the throttle valve 136. The throttle valve 136 generates an active signal to the line 130 when the throttle valve is at its 0-degree position (i.e., it is fully closed), and the throttle valve 136 generates an active signal on the line 132 when it is at its 90-degree position (i.e., it is fully open). The other four inputs to the bus driver 482 are connected via lines 540, 542, 544, and 546, to first leads of pullup resistors 550, 552, 554, and 556 and to the connector 120. The connector 120 is connectable to switches, to a computer, or to other means for switching the voltage levels on the lines 540–546. The outputs of the bus driver 482 are connected to the lines 350, 352, 354, 356, 358, and 360 of the data port 340. The inputs to the bus driver 482 on the lines 130 and 132 and the lines 540–546 are enabled onto the lines 350–360 when the line 382 and the RD line 432 are activated. The CPU 100 can thus check the signals on the lines 130 and 132 to determine whether the throttle valve 136 is in its fully closed position or in its fully open position.

The signals on the lines 540–546 can be advantageously used to provide a means of external communication with CPU 100. For example, the lines can be connected to manual switches to allow a user to manually direct the CPU 100 to perform selected functions. The CPU 100 is programmed to periodically enable the bus driver 482 to gate the signals from the lines 130 and 132 and from the lines 540–546 to the lines 350–360 to determine whether there have been any changes in the signal levels on any of the lines 530, 532, 540–546. Thus, the CPU 100 can determine whether to perform a function different from the functions which it is currently performing.

The bus driver 484 has six inputs which are connected to lines 570, 572, 574, 576, 578 and 580, and to first leads of pullup resistors 590, 592, 594, 596, 598, and 600, and to the connector 120. The second enable input line of the bus driver 484 is connected to the line 386 of the data port 342. The outputs of the bus driver 484 are connected to the lines 350, 352, 354, 356, 358, and 360 of the data port 340. Thus, the inputs to the bus driver 484 on the lines 570–580 are enabled onto the lines 340–350 when the line 384 and the RD line 432 are activated. The signals on the lines 570–580 can be advantageously used to select functions for the CPU 100 to perform. The CPU 100 is programmed to periodically enable the bus driver 484 to gate the signals from the lines 570–580 to the lines 340–350 to determine whether there have been any changes in the signal levels on any of the lines 570–580. Thus, the CPU 100 can determine whether to perform a function different from the functions which it is currently performing.

The set of RS232 drivers 152, shown in detail in FIG. 2c, comprises an MC1489 line driver from Motorola Inc., or the like. The set of RS232 drivers 152 comprises three driver gates 610, 612, and 614, which are three of the four gates available in the MC1489 integrated circuit. The gate 610 has an input connected to the line 412 in the bus 150 which is connected to the data port 346 of the CPU 100. The driver gate 610 is an inverting gate.

When the CPU 100 changes the signal level on the line 412, the output of the gate 610 on a line 620 will switch to the opposite signal level. The signal levels on the input line 412 are TTL compatible (i.e., zero to five volts), and the signal levels on the output line 620 are RS232 compatible (i.e., −15 volts to +15 volts). The CPU 100 is internally configured so that the signals generated on the line 412 are serial data signals. The line 620 is connectable to a device (not shown) which uses RS232 compatible serial communication so that the CPU 100 can transmit serial data to the device. The driver gates 612 and 614 are also inverting gates which receive input signals on the lines 418 and 420 from the data port 346 of the CPU 100 and which generate output signals on lines 626 and 628. In the preferraed embodiment, the lines 626 and 628 are CLEAR TO SEND lines and DATA TERMINAL READY lines, respectively, which are used by the CPU 100 to transmit status information to the device to which the lines are connected.

The set of bus receivers 160 comprises three gates 630, 632, and 634 which are preferably three of the four gates in an MC1488 integrated circuit from Motorola, Inc., or the like. The gate 630 has an input on a line 638 which is connectable to the serial data output of an RS232 device (not shown). The signal levels on the line 638 are RS232 compatible (i.e., −15 volts to +15 volts). The output of the gate 630 on the line 410 is TTL compatible (i.e., zero to five volts) and is provided as an input to the data port 346 of the CPU 100 so that the CPU 100 can receive serial data transmitted from an external device (not shown). The gates 632 and 634 have inputs connected to lines 642 and 644, respectively, which are preferably the RS232 signals REQUEST TO SEND and DATA SET READY, respectively. The gates 632 and 634 have outputs on the lines 414 and 424 which are connected to the data port 346 of the CPU 100 so that the CPU 100 can monitor the signal levels on the lines 642 and 644.

The lines 620, 626, 628, 642 and 644 are connected to the connector 154 so that a serial communication device, such as a computer terminal, can be connected to the apparatus of the present invention.

Figure 2D:
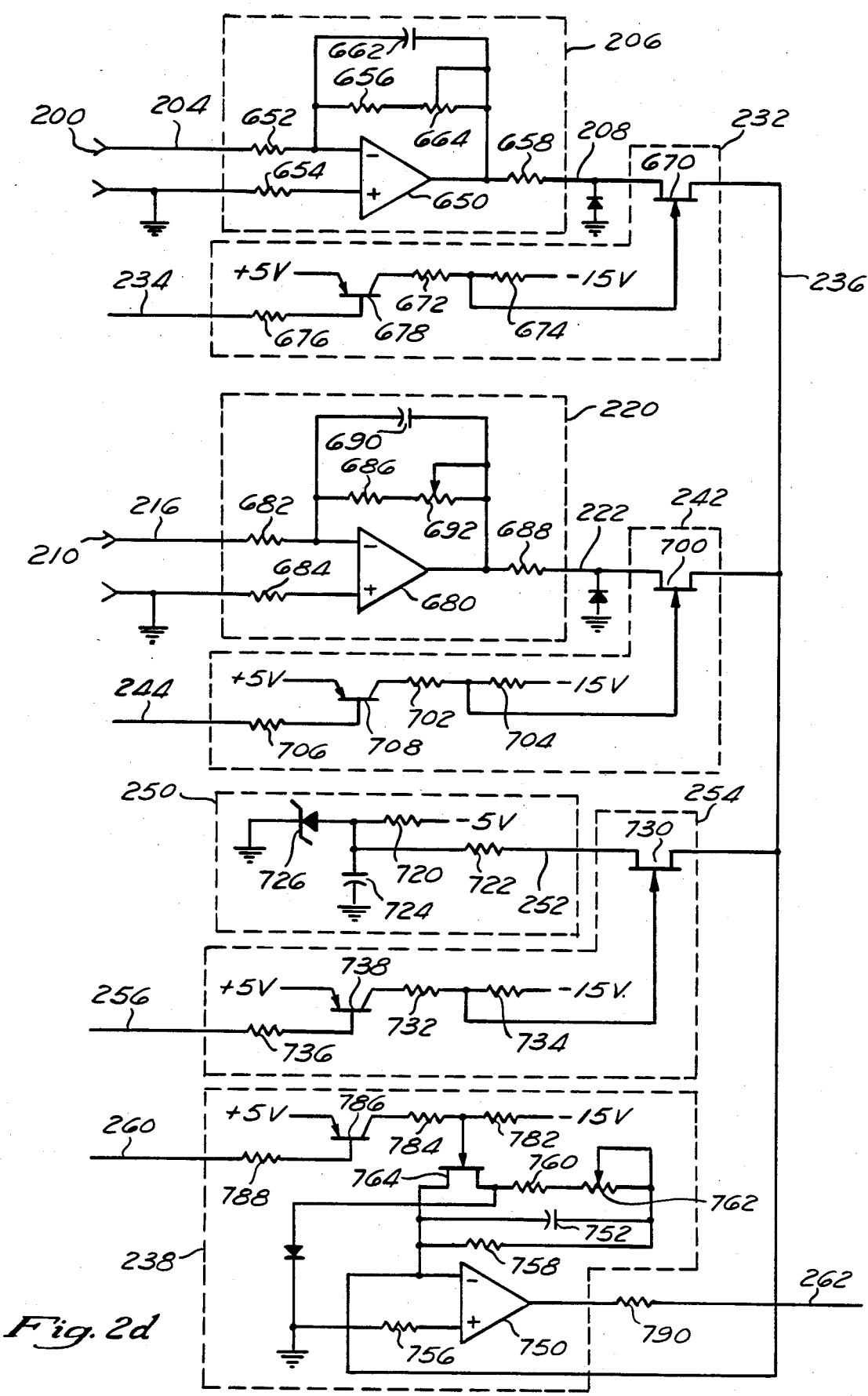

The operational amplifiers 206, 220, and 238, and their associated circuits are shown in detail in FIG. 2d. The operational amplifier 206 comprises an OP-27 operational amplifier 650 available from Precision Monolithics, Inc. The operational amplifier 650 has a negative input connected to one lead of a resistor 652, which has a second lead connected to the line 204 which is connected to the connector 200. The operational amplifier 650 is connected to the components shown comprising resistors 654, 656, and 658, a capacitor 662, and a potentiometer 664 to provide a signal on the output of the operational amplifier 650 which has a gain of −1 with respect to the signal input on the line 204 (i.e., if the line 204 has a signal level of +7 volts, the output of the operational amplifier 650 will have a signal level of −7 volts). The output of the operational amplifier 650 is connected to one lead of the resistor 658, which is preferably a 10,000 ohm resistor. The other lead of the resistor 658 is connected to the line 208.

The line 208 is connected to an electrically controlled switch 232 which comprises a junction field effect transistor JFET 670, resistors 672, 674, and 676, and a transistor 678. The resistor 676 is connected to an output of the CPU 100 via the line 234. When the CPU 100 generates a low signal level on the line 235 (i.e., zero volts), the transistor 678 conducts to cause the voltage on the gate of the JFET 670 to be approximately zero volts; and the JFET 670 conducts to act as a low resistance closed switch between the line 208 and the line 236. When the CPU 100 generates a high signal level on the line 234 (i.e., five volts), the transistor 678 does not conduct, the voltage on the gate of the JFET 670 is decreased to approximately −15 volts, and the JFET 670 stops conducting and becomes a very high resistance open switch, and the line 208 is disconnected from the line 236. Thus, the CPU 100 can control whether the signal from the line 208 is connected to the line 236 by selectively controlling the signal on the line 234.

The operational amplifier 220 comprises an OP-27 operational amplifier 680 and resistors 682, 684, 686, and 688, a capacitor 690, and a potentiometer 692. The resistor 682 is connected to the line 216 which is connected to the pressure input connector 210. The operational amplifier 220 provides a gain of −1 from the line 216 to the output of the operational amplifier 680. The output of the operational amplifier is connected via the resistor 688 to the line 222. The resistor 688 is preferably a 10,000 ohm resistor.

The switch 242 comprises a JFET 700, resistors 702, 704, and 706, and a transistor 708. The drain of the JFET 700 is connected to the line 222 and the source of the JFET 700 is connected to the line 236. The resistor 706 is connected to the line 244 which is connected to an output of the CPU 100. The switch 242 operates in the manner described above in connection with the switch 206. When the CPU 100 generates a low signal level on the line 244, the JFET 700 conducts and provides a low resistance connection from the line 222 to the line 236. When the CPU 100 generates a high signal level on the line 244, the JFET 700 does not conduct and the line 222 is disconnected from the line 236.

The offset voltage source 250 comprises resistors 720 and 722, a capacitor 724, and a zener diode 726. The resistors 720, 722 and the zener diode 726 are connected as shown to provide a voltage of −0.5 volts with respect to ground. The resistor 722 is connected via the line 252 to the electrically controlled switch 254. The electrically controlled switch 254 comprises a JFET 730, resistors 732, 734, and 736, and a transistor 738, which are connected in the same manner as corresponding components in the switches 232 and 242. The resistor 736 is connected via the line 256 to an output of the CPU 100. The JFET 730 has its drain connected to the line 252 and has its source connected to the line 236. When the CPU 100 generates a low signal on the line 256, the offset voltage (−0.5 volts) from the offset voltage source is added to the signal on the line 236 through the resistor 722, which is preferably a 10,000 ohm resistor. When the CPU 100 generates a high signal on the line 256, the offset voltage is disconnected from the line 236. Thus, the offset voltage can be selectively added to the line 236.

The operational amplifier 238 comprises an OP-27 operational amplifier 750, a capacitor 752, resistors 756 and 758, a potentiometer 762, and a junction field effect transistor 764. The operational amplifier 750 has its negative input tied to the line 236 and its positive input connected to one lead of the resistor 765, which has its other lead tied to the ground reference. The resistor 758 is preferably a 24,000 ohm resistor and is connected from the output of the operational amplifier 750 to the negative input of the operational amplifier 750. In the preferred embodiment, the resistors 658 and 688, connected to the outputs of the operational amplifiers 206 and 220, respectively, are 10,000 ohm resistors. Thus, the resistor 758 causes the operational amplifier 750 to have a gain of −10 with respect to the outputs of the operational amplifiers 206 and 220.

The resistor 760 and the potentiometer 762 are connected in series with the JFET 764. The gate of the JFET 764 is connected to resistors 782 and 784. The resistor 784 is connected to a transistor 786. The base of the transistor 786 is connected to a resistor 788. The resistor 788 is connected to an output of the CPU 100 via the line 260. When the CPU 100 generates a low signal on the line 260, the JFET 764 is enabled and the resistor 760 and the potentiometer 762 are connected across the resistor 758. The values of the resistor 760 and the potentiometer 762 are selected so that the parallel feedback resistance when they are added to the circuit is approximately 10,000 ohms. Thus, the amplifier 750 then has a gain of −1 with respect to the output of the operational amplifiers 206 and 220. The resistor 722 in the offset voltage source circuit 250 is preferably a 24,000 ohm resistor. Thus, the operational amplifier 750 has a gain of approximately −0.416 with respect to the −1.2 volts from the Zener diode voltage reference. When the offset voltage source is selected, the output of the operational amplifier 750 will be approximately +0.5 volts. The 0.5 volts can be added to the outputs of either the operational amplifier 206 or the operational amplifier 220 to compensate for small negative input voltages on the inputs to the operational amplifiers 206 or 220.

The output of the operational amplifier 750 is connected to one lead of a resistor 790. The resistor 790 has a second lead connected to the line 262 and thus to the ADC 140. One can see that the CPU 100 can select the signal which is provided as the input to the ADC 140 by selectively activating the switches 232, 242 and 254. The CPU 100 can also select the gain of the signal so provided by selectively activating the JFET 764.

Also shown in FIG. 2b are the motor drivers 180, 182, 184, and 186. The motor driver 180 comprises a resistor 800, having one lead connected to the line 170. The resistor 800 has a second lead connected to the anode of a diode 802. A cathode of the diode 802 is connected to the base of a transistor 804. The emitter of the transistor 804 is connected to the ground reference. Thus, a high signal level on the line 170 causes the transistor 804 to conduct, and a low signal level on the line 170 causes the transistor 804 to quit conducting. The collector of the transistor 804 is connected to one lead of a resistor 806 which has a second lead connected to the +5 volt DC reference. The collector of the transistor 804 is also connected to the base of a transistor 808. The emitter of the transistor 808 is connected to the ground reference. When the transistor 804 conducts, the voltage on the base of the transistor 808 is low and the transistor 808 does not conduct. Conversely, when the transistor 804 is not conducting, the transistor 808 conducts. Thus, the transistor 808 conducts when the output of the CPU 100 on the line 170 is low and does not conduct when the output of the CPU 100 on the line 170 is high. The collector of the transistor 808 is connected via the line 190 to a pin 820 in the connector 134, which is connected to a phase winding in the stepper motor (not shown) in the throttle valve 136 (FIG. 1). The connector 134 also includes a pin 822 which is connected to a source of +30 volts DC. The 30 volts DC is provided as a common voltage to the phase windings of the stepper motor (not shown).

When the transistor 808 conducts, a path is completed from the +30 volts DC source through the phase winding connected to the pin 820 to drive the stepper motor. The line 190 is also connected to the anode of a diode 824. The cathode of the diode 824 is connected to the cathode of a Zener diode 826. The anode of the Zener diode 826 is connected to the +30 volt DC supply. The diode 824 and the Zener diode 826 provide a voltage limiter to keep the voltage on the line 190 from exceeding the voltage limits on the transistor 808 when the current in the stepper motor phase winding is cut off.

The motor drivers 182, 184, and 186 are constructed in the same manner as the motor driver 180. The CPU causes the stepper motor to step in either of two directions by activating the lines 170, 172, 174, and 176 in sequence to thereby drive the phase windings of the stepper motor (not shown) in sequence. The manner of driving stepper motors is well-known to the art.

Figure 3:
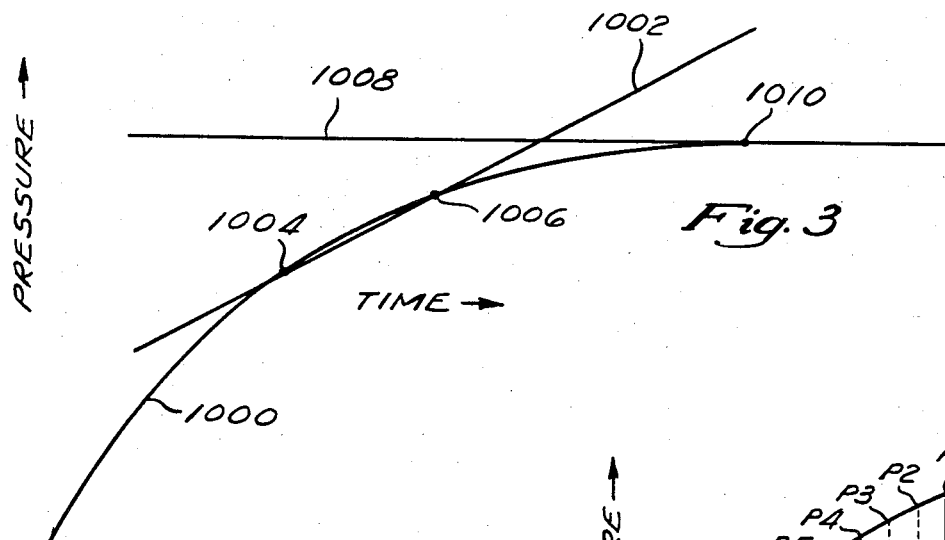
FIG. 3 is a graphical representation of pressure as a function of time in a pressure control system.

FIG. 3 represents a typical pressure curve 1000 in a pressure control system which uses the apparatus of the present invention as described above. In FIG. 3, time is increasing to the right and pressure is increasing vertically as represented by the two arrows. A line 1002 represents the slope of the curve 1000 taken between two pressures 1004 and 1006. A line 1008 represents the slope of the pressure curve 1000 at a pressure 1010. The slope represented by the line 1008 is substantially equal to zero and represents no pressure change over time at that pressure reading 1010. In a perfect pressure control system, the pressure 1010 corresponds to the desired pressure in the system, and the pressure in the system increases along the curve 1000 to the pressure 1010 and remains constant. The apparatus and method of the present invention provide a means for controlling the pressure in a system so that the ideal pressure curve shown in FIG. 3 is approximated and overshoots of the pressure are substantially reduced.

Figure 4:
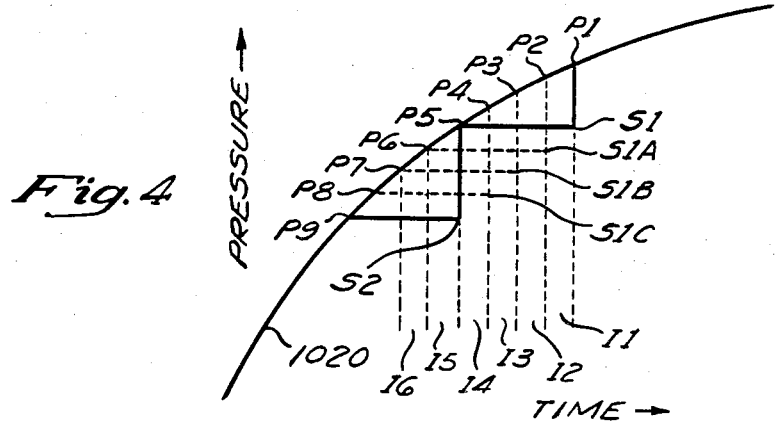
FIG. 4 is a graphical representation of pressure as a function of time as controlled in the present invention, showing a history of measured pressures, time intervals between measured pressures, and slopes of pressure changes versus time.

The terminology as used herein will be set forth in connection with FIG. 4 and FIGS. 5, 6, 7, and 8. In FIG. 4, a typical pressure curve 1020 is illustrated. The pressure is sampled at a periodic rate which, in the preferred embodiment, is every two milliseconds. The sampled pressures are stored in the system and are available to calculate the changes in pressure with respect to time. In the preferred embodiment, described hereinafter, time is given in the number of measurement steps rather than in seconds. However, time can be determined by multiplying the number of measurement steps in the preferred embodiment by two milliseconds.

In FIG. 4, the most recent pressure measurement is indicated as P1. The next most recent pressure measurement is indicated as P2 and so on. In the preferred method, the five most recent pressure measurements are saved as pressures P1–P5. In the preferred embodiment, the change in pressure with respect to time is determined by calculating the difference between the pressure P1 and the pressure P5 and dividing that by the amount of time elapsed between the measurement of the pressure P5 and the measurement of the current pressure P1. The intervals between the pressure measurements are shown as I1–I6, wherein I1 corresponds to the time elapsed between the measurement of the pressure P1 and the measurement of the pressure P2, I2 corresponds to the interval between the measurement of the pressure P2 and the pressure P3, and so on. Although shown as equal time increments, the intervals I1–I6 are not necessarily equal if the pressure does not change between each measurement step.

The rate of change of pressure is indicated by the slope S1 which is the difference between the pressure P1 and P5, divided by the time intervals I1+I2+I3+I4. Using multiple time intervals allows the slope S1 to be determined with greater accuracy than if it is determined between two succeeding time intervals. As the pressure measurements are taken in succession, old slope values are saved as intermediate values in the memory associated with the CPU 100 and are shown in phantom lines as slopes S1A, S1B, and S1C. The apparatus and method of the present invention also save a slope S2 which was determined on the fourth pressure measurement prior to the current pressure measurement. Thus, the slope S2 is available to calculate the rate at which the slopes are changing over time.

Figure 5:
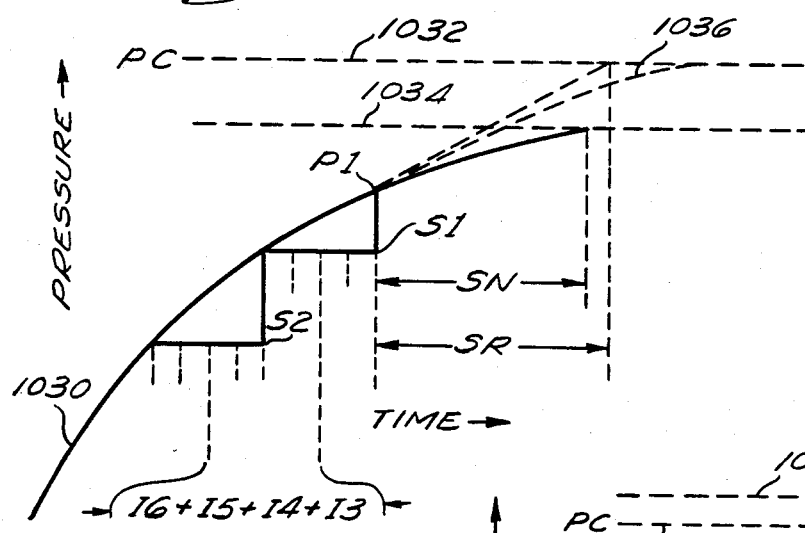
FIGS. 5 and 6 are graphical representations of increasing pressure versus time showing the amount of time remaining to reach a desired pressure and the amount of time required for the slope of the pressure changes to go to zero.

FIG. 5 illustrates a pressure curve 1030 and a desired pressure PC represented by a phantom line 1032. The system of the present invention first determines the difference between the desired pressure PC and the current pressure P1 and calculates the current slope S1 based upon previous pressure measurements. The difference between the desired pressure PC and the current pressure P1 divided by the slope S1 provides an approximation of the amount of time required for the pressure to increase from the pressure P1 to the pressure PC. This time is represented as the number of two millisecond measurements steps taken by the system. The amount of time is referred to hereinafter as "steps remaining" and is indicated on FIG. 5 as the dimension "SR". The system also determines the rate at which the slope is changing by calculating the difference between slope S1 and the slope S2 and dividing that difference by the amount of time elapsed between the measurement of the slope S1 and the measurement of the slope S2. In the preferred embodiment, the time elapsed is taken as the sum of the intervals I6, I5, I4, and I3 which corresponds to the time between the centers of the two measurements. Thus, the system compensates for a situation where the slope S1 is measured over a significantly different time duration than the slope S2 was measured. The amount of time required for the slope of the curve 1030 to decrease to zero is determined by dividing the current slope S1 by the rate at which the slopes are changing as determined in the previous step. This time is referred to hereinafter as the "steps needed" and is indicated on FIG. 5 by the dimension "SN".

In the example presented in FIG. 5, one can see that the steps needed for the slope to decrease to zero is less than the steps remaining for the pressure to increase to the desired pressure PC. Thus, since the steps needed is less than the steps remaining, the pressure cannot reach the desired pressure PC on the curve 1030. Thus, the throttle valve 136 must be adjusted so that the rate at which the rate of change of pressure is decreasing is smaller. In a vacuum system where a pump is evacuating gas from the chamber, the rate of flow of the gas of the chamber can be decreased by closing the throttle valve and thus the rate at which the rate of change of pressure is decreasing is reduced and the curve 1030 will change to the curve 1036 illustrated in phantom lines from the pressure P1 to the pressure PC. The apparatus and method of the present invention continuously make the foregoing measurements and comparisons so that the pressure curve 130 has a slope substantially equal to zero when it reaches the desired pressure PC along the phantom line 1032.

Figure 6:
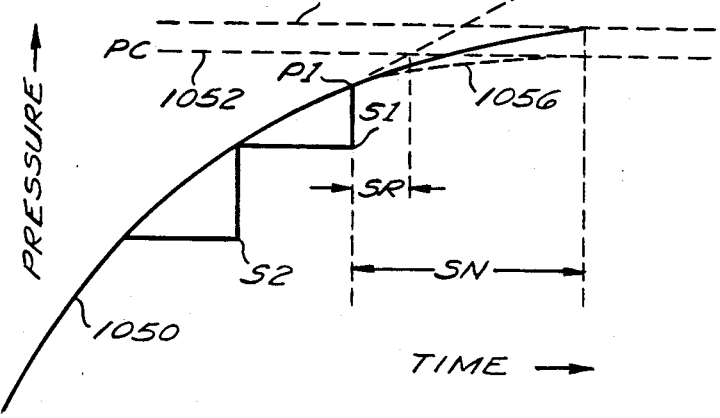

FIG. 6 illustrates a curve 1050 similar to the curve 1030 in FIG. 5. In this example, the pressure PC is shown as a phantom line 1052 and the pressure at which the slope of the pressure curve goes to zero is shown as a pressure 1054. In FIG. 6, the steps remaining, SR, for the pressure to reach the desired pressure PC is less than the steps needed, SN, for the change in pressure to go to substantially zero. Thus, since the pressure curve 1050 will overshoot the desired pressure PC, the system and methods of the present invention cause the throttle valve 136 to open to further increase the rate at which the rate of change of pressure is reduced. The new pressure curve from P1 caused by the change in the amount of opening of the throttle valve 136 is shown by a phantom line 1056.

Figure 7:
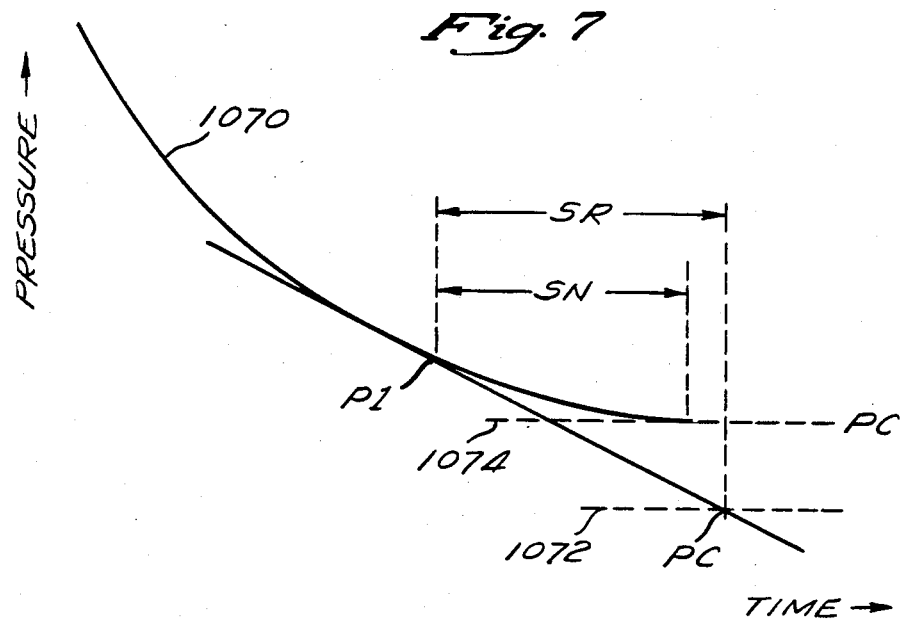
FIGS. 7 and 8 are graphical representations of decreasing pressure versus time showing the amount of time remaining to reach a desired pressure and the amount of time required for the slope of the pressure changes to go to zero.
Figure 8:
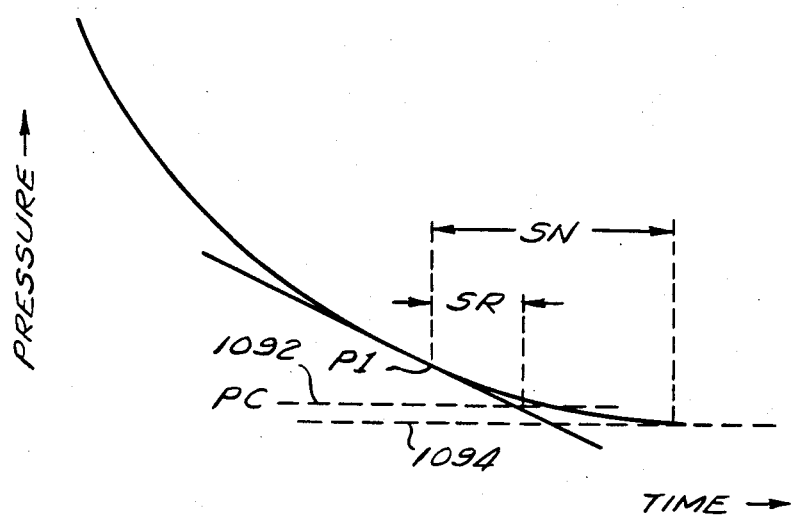

FIGS. 7 and 8 illustrate the decreasing pressure curves. In FIG. 7, a pressure curve 1070 is headed for a desired pressure PC represented by a phantom line 1072. The rate of change in the pressure along the curve 1070 is increasing from a negative slope towards a slope of zero at a rate such that the rate of change of pressure will be substantially zero at a pressure represented by a phantom line 1074. In FIG. 7, the rate of change of pressure will be substantially zero at a pressure which is greater than the desired pressure and therefore the steps needed SN to reach a pressure slope of zero is less than the steps remaining SR for the pressure to reach the desired pressure. Thus, the system needs to open the throttle valve so that the pressure will decrease at a higher rate in order to reach the desired pressure.

In FIG. 8, the pressure is decreasing along a curve 1090 towards a desired pressure PC represented by the phantom line 1092. The rate at which the rate of change of pressure is increasing towards a slope of zero is such that the pressure curve 1090 will pass through the desired pressure represented by the phantom line 1092 before the slope of the pressure curve reaches zero. Thus, the steps remaining SR is less than the steps needed SN and the throttle valve needs to be opened to cause the slope of the pressure to increase at a higher rate towards a zero slope.

Figure 9:
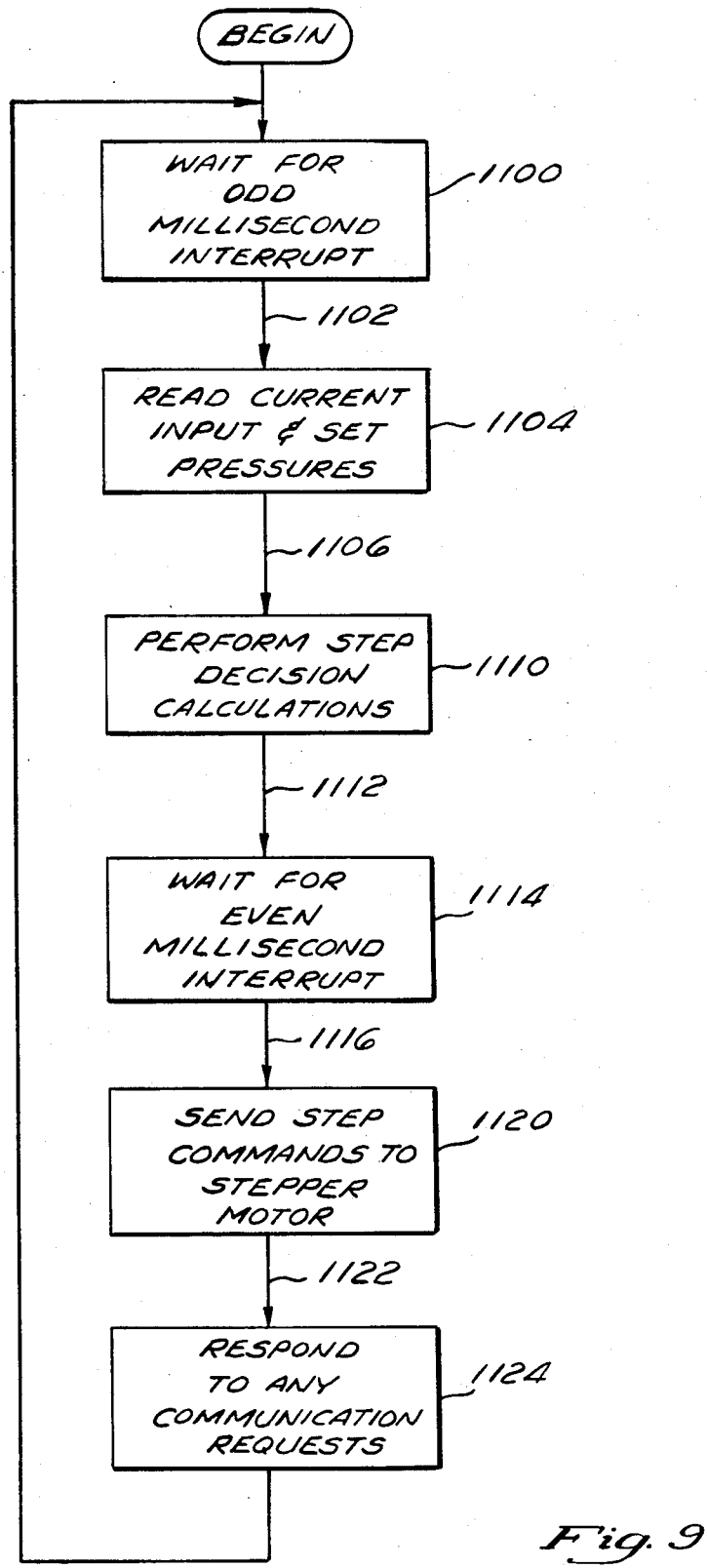
FIG. 9 is an overall flow diagram of the preferred method of the present invention.

FIG. 9 illustrates a basic flow chart showing the method of system operation for the present invention. The present invention operates from an internal timer in the CPU 100 which causes the CPU 100 to be interrupted every millisecond. Until the interrupt occurs, the CPU 100 is programmed to wait for the interrupt. This portion of the method is represented by an activity block 1100 in FIG. 9. When the first one millisecond interrupt occurs, control is transferred along a path 1102 to an activity block 1104 wherein the CPU 100 enables the switch 242 (FIG. 1) and reads the current input pressure which is converted to digital data by the analog-to-digital-converter (ADC) 140. The CPU 100 also reads the current set pressure by enabling the switch 232 and reading the output of the ADC 140. The operation of the activity block 1104 can be readily understood by one skilled in the art and will not be described in detail.

Control is passed from the activity block 1104 via a path 1106 to an activity block 1110 wherein the CPU performs the operations necessary to determine whether the stepper motor on the throttle valve 136 should be driven in either of the two directions in order to further open or further close the throttle valve 136. The functions performed in the activity block 1110 will be described hereinafter in detail in connection with FIGS. 10a–10e.

After the step decisions are made in activity block 1110, control is transferred along a path 1112 to an activity block 1114 wherein the CPU 100 waits for the next one millisecond interrupt. When the interrupt occurs, control is passed along a path 1116 to an activity path 1120 wherein the CPU sends step commands to the stepper motor based upon the decisions made in the activity block 1110. The operation of the stepper motor by sending sequenced phase commands to the motor drivers 180, 182, 184 and 186 (FIG. 1) can be readily understood by one skilled in the art and will not be discussed further.

After the motor is stepped as necessary, control is transferred along a path 1122 to an activity block 1124 wherein the CPU 100 services any communication requests which may come in on the RS232 bus 156 (FIG. 1) or which need to be transmitted on the RS232 bus 150. Furthermore, the CPU 100 will monitor the activity of the lines connected to the logic connector 120 (FIG. 1) to determined whether any manual requests for changes have occurred. Thereafter, control is transferred along a path 1126 back to the activity block 1100 wherein the CPU 100 waits for the next one millisecond interrupt and repeats the steps described above.

Figure 10A:
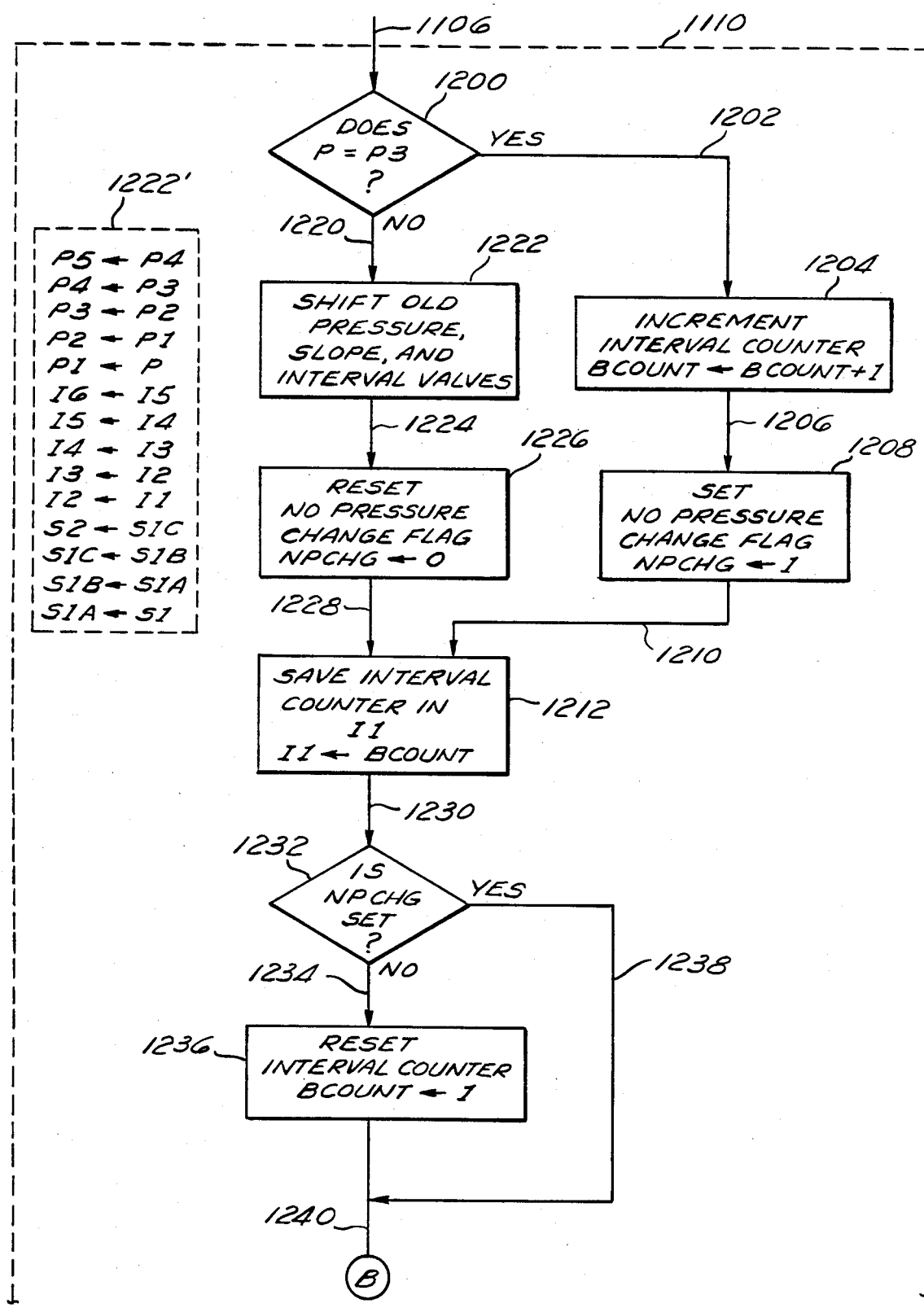
FIGS. 10a -10f are detailed flow diagrams of the activity block 1110 of FIG. 9 in the present invention.

FIGS. 10a, 10b, 10c, 10d, 10e and 10f are flow charts which provide further details of the functions performed in activity block 1110. In FIG. 10a, the program enters the activity block 1110 via the path 1106. The currently measured pressure is designated as the pressure P and the most recently measured pressure is designated as the pressure P3. The first thing that the program does upon entering into the activity block 1110 is to enter the decision block 1200 wherein the program compares the currently measured pressure P with the last measured pressure P3 and determines whether they are equal. If the pressures are equal, the program follows a path 1202 to an activity block 1204 wherein an interval counter, designated at BCOUNT, is incremented to maintain a running count of the number of steps since the last pressure change. Thereafter, the program follows a path 1206 to an activity block 1208 wherein the program sets a no pressure change flag NPCHG to indicate that the pressure has not changed. Thereafter, the program follows a path 1210 to an activity block 1212.

If the new pressure P was not equal to the old pressure P3 when the program entered the decision block 1200, the program follows a path 1220 to an activity block 1222 wherein the program shifts the previously measured and calculated pressure, slope and interval values to make room for the current pressure, slope and interval values. A summary of the activities within the activity block 1222 is shown in the activity block 1222' in phantom lines. For example, (referring to FIG. 4 for reference) the fourth most recently measured pressure P4 is shifted and stored into the storage location P5. Similarly, P3 is shifted into P4, P2 into P3, P1 into P2, and the new pressure P becomes P1. In a like manner, the interval count I5 is shifted into the interval count I6, I4 is shifted into I5 and so on until I1 is shifted into I2.

As a result of the activity in activity block 1222, there is now room for a new interval count. In like manner, the previously stored intermediate slope S1C is stored as S2, S1B is stored as S1C, S1A is stored as S1B and the most recently determined slope S1 is stored as S1A. When the shifting is concluded in the activity block 1222, control of the program is transferred via a path 1224 to an activity block 1226 wherein the no pressure change flag NPCHG is cleared or reset. Control is then transferred over a path 1228 to the activity block 1212 which is common to both sequences of operations which could have been taken from the activity block 1200.

In the activity block 1212, the current interval counter is stored as the new value of I1. This can be the recently incremented BCOUNT if the activity block 1204 was entered from the decision block 1200 or it can be the old BCOUNT which was not incremented in either the activity block 1222 or the activity block 1226. Thus, the storage location I1 always corresponds to the magnitude of the interval, in steps, since the last pressure change.

The program transfers from the activity block 1212 via a path 1230 to a decision block 1232 wherein the program checks the no pressure change flag NPCHG which was either set in the activity block 1208 or cleared in the activity block 1226. If the no pressure change flag NPCHG was not set, control is transferred via a path 1234 to an activity block 1236 wherein the interval counter BCOUNT is set back to one to begin a new interval count from the detected pressure change. Program control is transferred from the activity block 1236 via a path 1240 to an activity block 1250 shown in FIG. 10b. If the no pressure change flag NPCHG was set when tested in the decision block 1232, the activity block 1236 is bypassed via a path 1238 which joins the path 1240 to go directly to the activity block 1250 in FIG. 10b. Thus, if the no pressure change flag NPCHG is set, the interval counter, BCOUNT, is not reset to one and a running total of the number of steps since the last pressure change is maintained.

Figure 10B:
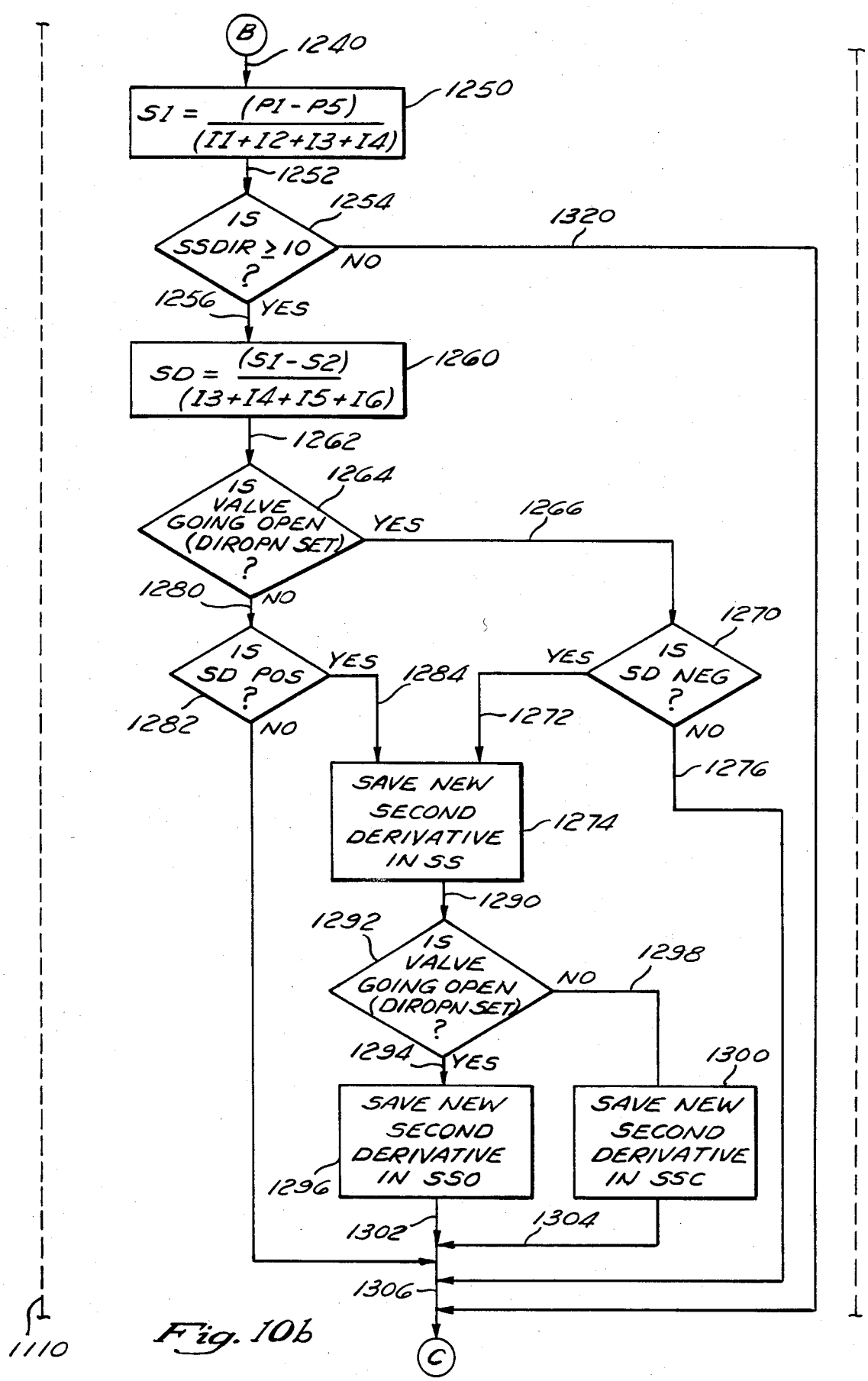

Referring now to FIG. 10b, the activity block 1250, which is entered via the path 1240, calculates the current slope. Referring back to FIG. 4, the current slope is the difference in the pressure P1 and the pressure P5 divided by the sum of the intervals between the pressure P5 and P4, the pressure P4 and P3, the pressure P3 and P2, and the pressure P2 and P1. These intervals are stored in the locations I4, I3, I2, and I1, respectively. Thus, the current slope can be calculated as follows:

$$S1 = \frac{(P1 - P5)}{(I1 + I2 + I3 + I4)} \quad (1)$$

After the slope S1 is determined, control transfers from the activity block 1250 via a path 1252 to a decision block 1254. In the decision block 1254, the system determines whether the throttle valve 136 has been stepped in the same direction by at least ten steps. The number of steps in the same direction is shown in the decision block 1254 as SSDIR and corresponds to the value in a steps same direction counter SSDIR. If the number of steps in the steps same direction counter SSDIR equals or exceeds ten, control is transferred from the decision block 1254 via a path 1256 to an activity block 1260. In the activity block 1260, the rate at which the slope is changing is calculated. This rate can be referred to as the second derivative of the pressure waveform and is abbreviated as SD in the activity block 1260. The second derivative SD is determined by subtracting the slope S2 from the slope S1. Referring briefly to FIG. 4, the slope S2 is the slope which was determined when the pressure P5 was measured. The difference between the slope S1 and the slope S2 is divided by the sum of the intervals I3, I4, I5 and I6 which is the amount of time elapsed from the approximate midpoint of the slope S2 to the approximate midpoint of the slope S1, as follows:

$$SD = \frac{(S1 - S2)}{(I3 + I4 + I5 + I6)} \quad (2)$$

Using the midpoints of the slopes S1 and S2 to determine the time intervals between the slopes S1 and S2 can partially alleviate any erroneous time intervals when the pressure is changing very slowly. FIGS. 11, 12, 13 and 14 illustrate four pressure curves which can assist in understanding the second derivative SD. The rate of change in the slopes SD, has a positive sign if the slopes are increasing as shown in FIGS. 12 and 13 and has a negative sign if the slopes are decreasing as shown in FIGS. 11 and 14. A negative sign for the rate of change of slope, SD, corresponds to the throttle valve 136 opening and thus causing the pressure to increase less rapidly (FIG. 11) or to decrease more rapidly (FIG. 14). A positive sign for the second derivative SD corresponds to the throttle valve 136 closing and thus causing the pressure to decrease less rapidly (FIG. 12) or to increase more rapidly (FIG. 13).

Control transfers from the activity block 1260 via a path 1262 to a decision block 1264 wherein the current status of the throttle valve 136 is checked. Whenever, as a result of the operations described herein, the throttle valve 136 is stepped in the direction to cause it to go more open, a flag, DIROPN, is set to indicate that the throttle valve is being further opened. This flag is checked in the decision block 1264 to determine which path to take from the decision block 1264. If the throttle valve 136 has been most recently driven in the open direction, a path 1266 is taken to a decision block 1270. In the decision block 1270, the sign of the second derivative SD determined in the activity block 1260 is checked to determine whether it is positive or negative. If the sign of the second derivative is negative, a path 1272 is taken to an activity block 1274 wherein the second derivative calculated in the activity block 1260 is saved in a temporary storage location SS. Since the throttle valve 136 is going open and the second derivative is negative, indicating that the pressure is decreasing more rapidly, or is increasing less rapidly, it can be presumed that the change in the rate of change of the pressure has been caused by the opening of the throttle valve. On the other hand, if it is determined in the decision block 1270 that the second derivative is positive rather than negative, then a path 1276 is taken to bypass the activity block 1274 because a positive second derivative is inconsistent with the throttle valve 136 going open. Thus, the change in the rate of change in pressure was not caused by the activity of the throttle valve 136, and should not be saved.

Returning to the decision block 1264, if the throttle valve 136 was not going open and the flag DIROPN is not set, then control is transferred via a path 1280 to a decision block 1282. In the decision block 1282, the sign of the second derivative is checked to determine whether it is positive. If the second derivative is positive, control is transferred via a path 1284 to the activity block 1274 where the new second derivative is saved. This is done because a positive second derivative is consistent with the throttle valve 136 going closed and thus causing the pressure to increase more rapidly or to decrease less rapidly. On the other hand, if the second derivative is not positive when tested in the activity block 1282, control is transferred via a path 1286 to bypass the storage of the new second derivative since the sign of the second derivative is inconsistent with the throttle valve 136 going closed.

Returning to the activity block 1274, after the new second derivative is temporarily stored in the location SS, control is transferred via a path 1290 to a decision block 1292. In the decision block 1292, the flag DIROPN is again checked to determine whether the throttle valve 136 is going open. If the throttle valve 136 is going open, control is transferred via a path 1294 to an activity block 1296 wherein the new second derivative is stored in a location designated as SSO, corresponding to the second derivative determined when the throttle valve 136 is going open. On the other hand, if the throttle valve is not going open when checked in the decision block 1292, control is transferred via a path 1298 to an activity block 1300 wherein the new second derivative is stored in a location designated as SSC, corresponding to the second derivative when the throttle valve is going closed. Control is transferred from the activity block 1296 via a path 1302 and from the activity block 1300 via a path 1304 to a common path 1306 which transfers control to a decision block 1308 in FIG. 10c. The paths 1276 and 1286 also transfer control to the path 1306.

Returning again to the decision block 1254 in FIG. 10b, if the steps in the same direction counter SSDIR has a value less than 10, it is presumed that the effect of changing the throttle valve in one direction has not had an adequate amount of time to cause a unambiguous effect on the pressure. Therefore, the steps of determining the second derivative in the activity block 1260 and storing the second derivative in the activity block 1296 or the activity block 1300 are bypassed via a path 1320 and control is transferred to the decision block 1308 in FIG. 10c via the path 1306.

Figure 10C:
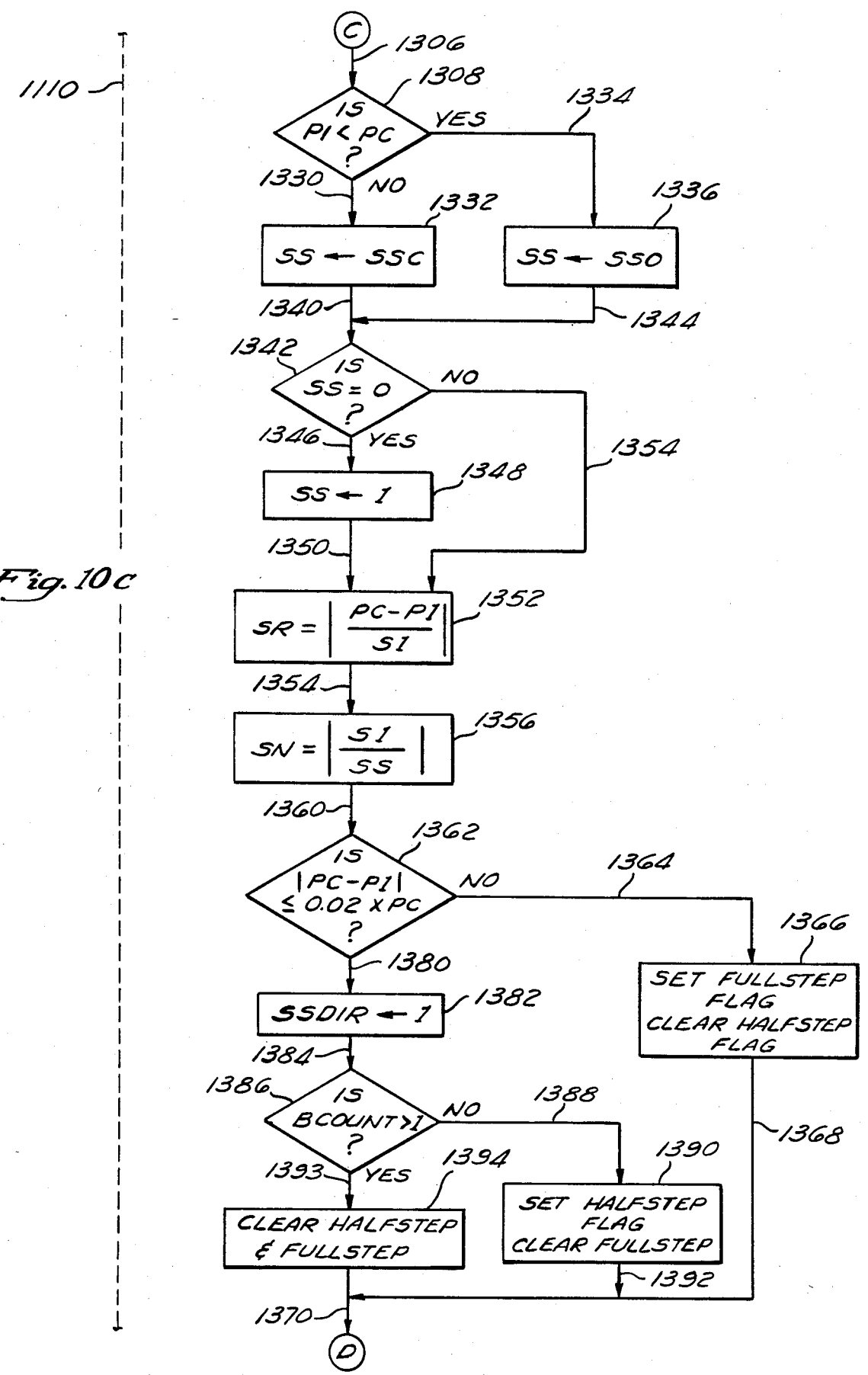

In the decision block 1308 in FIG. 10c, the current pressure, P1 is checked to determined whether it is less than or greater than the desired pressure PC. If the pressure P1 is greater than the pressure PC, control is transferred via a path 1330 to an activity block 1332. In the activity block 1332, the most recently calculated second derivative with the throttle valve 136 going closed, SSC, is transferred to the temporary storage location SS for use in subsequent operations. Since the pressure P1 is greater than the pressure PC, it must be presumed that the throttle valve 136 is opened to cause the pressure to decrease and that, at some time in the future, the throttle valve 136 needs to be closed to cause the slope of the pressure to decrease to zero just as the pressure P1 is equal to the pressure PC. Thus, the ability of the throttle valve 136 to change the pressure as it goes closed must be used in the calculations. Therefore, the second derivative of the pressure for the throttle valve going closed is transferred to the storage location SS for use in the calculations.

If the pressure P1 is less than the PC when tested in the decision block 1308, control is transferred via a path 1334 to an activity block 1336 wherein the second derivative of the pressure when the throttle valve 136 is going open, SSO, is transferred to the temporary storage location, SS. Since the pressure must be increasing at this point in order to reach PC and since the throttle valve 136 must be opened at some point in the future in order to cause the slope of the pressure change to be equal to zero at the time the desired pressure PC is reached, the ability of an opening throttle valve 136 to change a positive going slope to a zero slope is used to make subsequent calculations. Thus, the second derivative of the pressure for the throttle valve 136 going open is transferred to SS to use in the subsequent calculations.

Control is transferred from the activity block 1332 via a path 1340 to a decision block 1342. Similarly, control is transferred from the activity block 1336 via a path 1344 to the decision block 1342. In the decision blcok 1342, the second derivative stored in the temporary location SS is checked to determined whether it is zero. If it is zero, control is transferred via a path 1346 to an activity block 1348 wherein a slope of one is stored in the temporary location SS. This eliminates the problem when the system is first started up and a second derivative has not been determined. Control is transferred from the activity block 1348 via a path 1350 to an activity block 1352. Returning to the decision block 1342, if the second derivative stored in the location SS is not zero, the activity block 1348 is bypassed via a path 1354 directly to the activity block 1352.

In the activity block 1352, the steps remaining SR, discussed above in connection with FIGS. 5–8, is determined by subtracting the current pressure P1 from the desired pressure PC and dividing it by the current slope S1 as follows:

$$SR = \left| \frac{(PC - P1)}{S1} \right| \qquad (3)$$

The absolute value of this calculation is taken and the result corresponds to the number of steps remaining for the measured pressure to reach the desired pressure if the current slope of the pressure curve is maintained.

Control is transferred from the activity block 1352 via a path 1354 to an activity block 1356 wherein the steps needed SN to change the slope of the pressure to a zero value is calculated by dividing the current slope by the second derivative stored in the location SS as follows:

$$SN = \left| \frac{S1}{SS} \right| \qquad (4)$$

The absolute value of the calculation is taken and the result is saved as SN.

Control is transferred from the activity block 1356 via a path 1360 to a decision block 1362. In the decision block 1362, the absolute value of the difference between the measured pressure P1 and the desired pressure PC is determined and compared with a percentage of the desired pressure PC. If the differnce in the measured pressure P1 and the desired pressure PC is greater than 2% of the desired pressure PC, control is transferred from the activity block 1362 via a path 1364 to an activity block 1366. In the activity block 1362, a FULLSTEP flag is set and a HALFSET flag is cleared to indicate that a full step of the stepper motor which controls the throttle valve 136 is to be taken. Control is transferred from the activity block 1366 via a path 1368 and a path 1370 to a decision block 1372 in FIG. 10d.

Returning to the decision block 1362 in FIG. 10c, if the difference in the measured pressure P1 and the desired pressure PC is less than or equal to 2% of the desired pressure PC, control is transferred from the decision block 1362 via a path 1380 to an activity block 1382. In the activity block 1382, the steps same direction counter SSDIR is set to one so that no second derivatives will be calculated while the measured pressure is within 2% of the desired pressure. Returning briefly to the decision block 1254 in FIG. 10b, resetting the steps same direction counter SSDIR to one causes the path 1320 to always be taken and to therefore bypass the determination and saving of a new second derivative. Since the pressure changes in the range close to the desired pressure should be very small, a second derivative determined in this range of pressure wound not accurately represent the ability of the throttle valve to cause changes in the slope of the pressure changes. Thus, calculations of second derivatives are inhibited while within this range of pressures. The range of pressures within 2% of the desired pressure PC is referred to as the approach band. Other choices of percentages for the approach band can be chosen in alternative embodiments of the invention.

Control is transferred from the activity block 1382 via a path 1384 to a decision block 1386. In the decision block 1386, the current BCOUNT since the last pressure change is checked to determine whether it is greater than one. If it is not greater than one, indicating that the pressure has just changed to the current pressure, control is transferred via a path 1388 to an activity block 1390. In the activity block 1390, the HALFSTEP flag is set and the FULLSTEP flag is cleared to indicate that the stepper motor which controls the throttle valve 136 should be driven by only one-half step, rather than a full step. Since the pressure is within the approach band, it is desirable that changes in the opening of the throttle valve 136 be kept small. Thus, the stepper motor is only stepped one-half of a step at a time. Control is transferred from the activity block 1390 via a path 1392 to the path 1370 and thus to the decision block 1372 in FIG. 10d.

Returning again to the activity block 1386 in FIG. 10c, if the number of steps since the last pressure change is greater than one, indicating that the pressure has stayed at the same measurement for at least two steps, then control is transferred via a path 1393 to an activity block 1394. In the activity block 1394, the FULLSTEP and HALFSTEP flags are cleared to indicate that the stepper motor which controls the throttle valve 136 should not be driven in either direction. Since the pressure has not changed, and since it is within the approach band, activity of the throttle valve 136 is minimized to keep the pressure within the approach band.

Figure 10D:
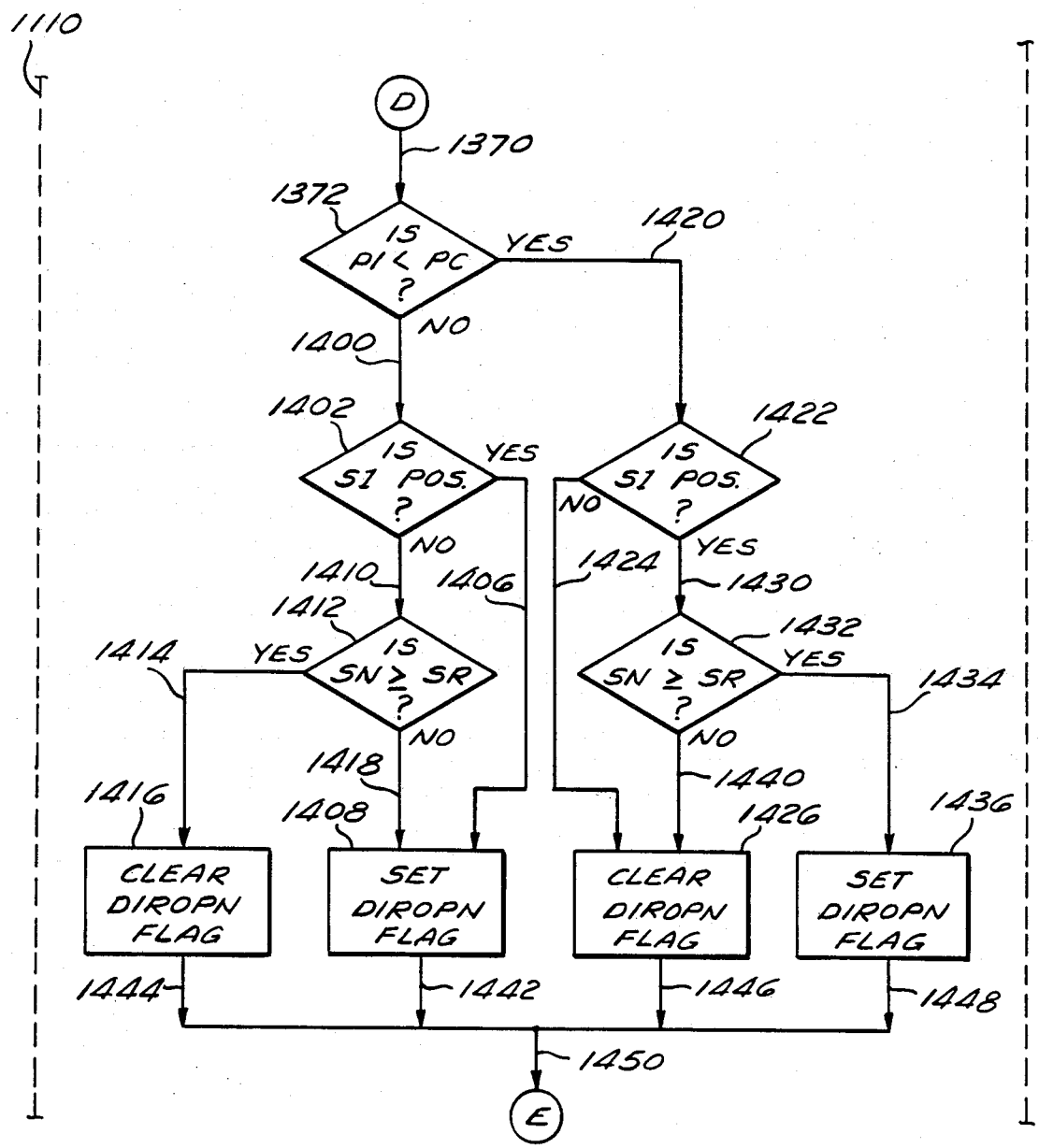

In the activity block 1372 in FIG. 10d, the pressure P1 is again compared to the desired pressure PC. If the pressure P1 is greater than the pressure PC, control is transferred from the decision block 1372 via a path 1400 to a decision block 1402. In the decision block 1402, the sign of the slope S1 is tested to see if it is positive or negative. If the sign of the slope S1 is positive, the pressure is increasing, and control is transferred via a path 1406 to an activity block 1408 wherein the direction open flag DIROPN is set. This is done automatically since the pressure P1 is already greater than the desired pressure and is increasing. Therefore, opening the throttle valve 136 is necessary to decrease the pressure.

Returning to the decision block 1402, if the slope S1 is not positive, control of the program is transferred via a path 1410 to a decision block 1412. In the decision block 1412, the steps needed SN are compared with the steps remaining SR. If the steps needed SN are greater than or equal to the steps remaining SR, control is transferred via a path 1414 to an activity block 1416 wherein the direction open flag DIROPN is cleared to indicate that the throttle valve 136 should be closed. The pressures which result in control being transferred to the activity block 1416 correspond to the pressures in a waveform such as the one illustrated in FIG. 8 wherein the steps needed SN is greater than the steps remaining SR and the current pressure P1 is greater than the desired pressure PC. Since the slope of the pressure will not change to zero prior to the pressure passing through the desired pressure PC, it is necessary to close the throttle valve 136 further to slow the rate at which the pressure is decreasing.

Returning to the decision block 1412, if the steps needed SN are less than the steps remaining SR, control is transferred via a path 1418 to the activity block 1408 wherein the direction open flag DIROPN is set to cause the throttle valve to be further opened. This corresponds to a pressure waveform such as the one illustrated in FIG. 7 wherein the steps needed SN are less than the steps remaining SR and the slope of the pressure waveform will go to zero before reaching the desired pressure PC. Thus, the throttle valve 136 must be opened further to cause the pressure to decrease at an increasing rate.

Returning again to the decision block 1372, if the pressure P1 is less than pressure PC, control is transferred via a path 1420 to a decision block 1422 wherein the slope S1 is checked to determine whether it is positive. If the slope S1 is not positive, control is transferred via a path 1424 to an activity block 1426 wherein the direction open flag DIROPN is cleared. This occurs because the pressure P1 is below the desired pressure PC and the pressure is decreasing further. Therefore, the throttle valve 136 must be closed further to allow the pressure to increase.

Returning again to the decision block 1422, if the slope of the pressure S1 is positive, control is transferred via a path 1430 to a decision block 1432. In the decision block 1432, the steps needed SN are compared to the steps remaining SR and, if the steps needed SN are greater than or equal to the steps remaining SR, control is transferred via a path 1434 to an activity block 1436. In the activity block 1436, the direction open flag DIROPN is set to cause the throttle valve 136 to open. This corresponds to the pressure waveform such as the one illustrated in FIG. 6 wherein the pressure waveform will pass through the desired pressure PC prior to the slope of the pressure waveform going to zero. Thus, throttle valve 136 needs to be opened further to slow down the increase in the pressure.

Returning again to the decision block 1432, if the steps needed SN are less than the steps remaining SR, control is transferred via a path 1440 to the activity block 1426 wherein the direction open flag DIROPN is cleared to cause the throttle valve to be closed further during the next step. This occurs because the pressure waveform corresponds to a pressure waveform such as the one illustrated in FIG. 5 wherein the steps remaining SR are greater than the steps needed SN. Since the slope of the pressure waveform will go to zero prior to the pressure reaching the desired pressure PC, the throttle valve must be closed further to cause the pressure to increase more rapidly.

Figure 10E:
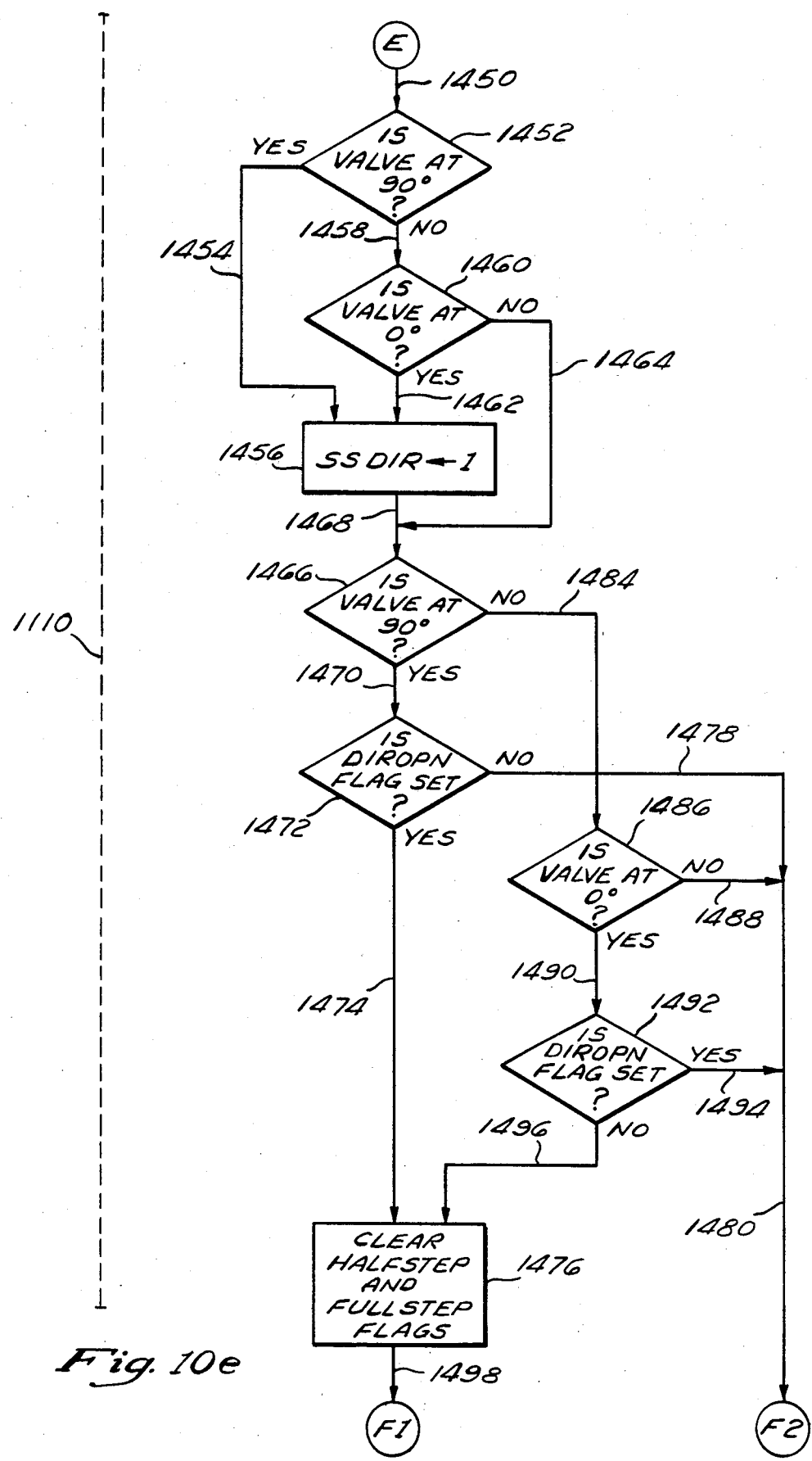

Control is transferred from the activity blocks 1408, 1416, 1426 and 1436 via paths 1442, 1444, 1446 and 1448, respectively, to a path 1450, which transfers control to a decision block 1452 in FIG. 10e.

In the decision block 1452, the status of the line 132, (FIG. 1) is checked to determine whether the throttle valve 136 is at the 90-degree position (i.e., fully open). If it is at the 90-degree position, control is transferred via a path 1454 to an activity block 1456 wherein the steps same direction counter SSDIR is set to one to indicate that the throttle valve has not been stepped since the last pressure change. This prevents the second derivative from being calculated in FIG. 10b during the next pass through the activity block 1110. If the throttle valve is not at the 90-degree position, control is transferred via a path 1458 to a decision block 1460 wherein the line 130 (FIG. 1) is checked to determine whether the throttle valve is at the zero-degree position, (i.e., fully closed). If the throttle valve is at zero-degree position, control is transferred via a path 1462 to the activity block 1456 wherein the steps same direction counter SSDIR is set to one. If the throttle valve is not at the zero-degree position, control is transferred via a path 1464 to bypass the activity block 1456 and transfer control to a decision block 1466. Control is also transferred from the activity block 1456 to the decision block 1466 via a path 1468.

In the decision block 1466, the throttle valve is again checked to see if it is at the 90-degree position. If it is at the 90-degree position, control is transferred via a path 1470 to a decision block 1472 wherein the direction open flag DIROPN is checked to determine whether it is set. If the direction open flag DIROPN is set, control is transferred via a path 1474 to an activity block 1476 wherein the HALFSTEP and FULLSTEP flags are cleared because the stepper motor cannot be opened beyond the fully open (90-degree) position of the throttle valve.

Figure 10F:
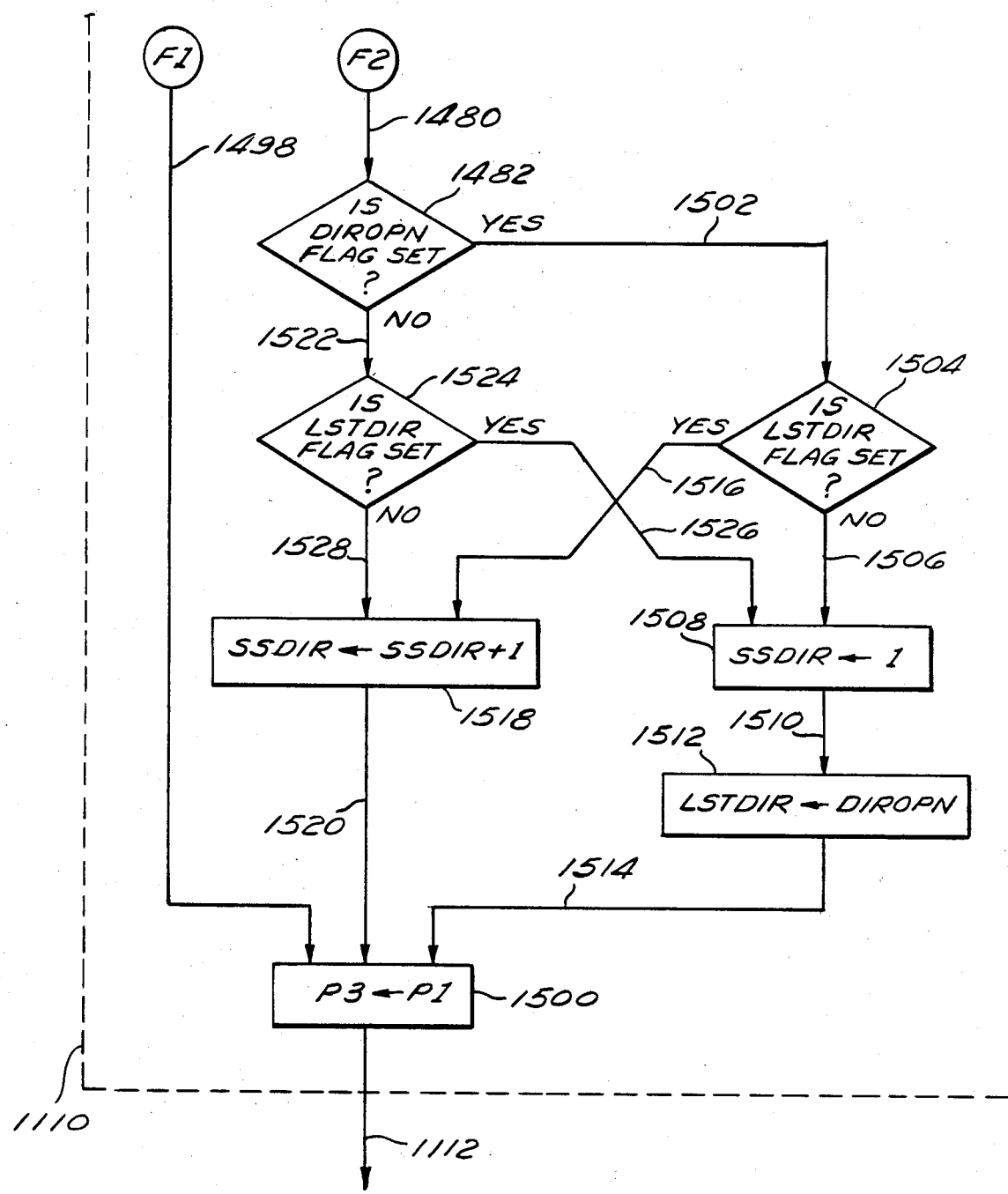

Returning to the decision block 1472, if the direction open flag DIROPN is not set, control is transferred via a path 1478 and a path 1480 to a decision block 1482 in FIG. 10f. Since the direction open flag DIROPN is not set, the stepper motor will be stepped from the 90-degree position of the throttle valve.

Returning to the decision blok 1466 in FIG. 10e, if the throttle valve is not at the 90-degree position, control is transferred via a path 1484 to a decision block 1486. In the decision block 1486, the throttle valve is checked to see if it is the zero-degree position. If the throttle valve is not at the zero-degree position, control is transferred via a path 1488 and the path 1480 to the decision block 1482 in FIG. 10f. If the throttle valve is at the zero-degree position, control is transferred via a path 1490 to a decision block 1492 wherein the direction open flag DIROPN is checked to determine whether it is set. If the direction open flag DIROPN is set, the throttle valve can be opened from the zero-degree position, and control is transferred via a path 1494 and the path 1480 to the decision block 1482 in FIG. 10f. If the direction open flag DIROPN is not set, and since the throttle valve is at the zero-degree position, the throttle valve cannot be moved further, and control is transferred via a path 1496 to the activity block 1476 wherein the HALFSTEP and FULLSTEP flags are reset to prevent the system from attempting to step the stepper motor beyond the zero-degree position of the throttle valve.

Control is transferred from the activity block 1476 via a path 1498 to an activity block 1500 in FIG. 10f.

Referring now to FIG. 10f, in the decision block 1482 the direction open flag DIROPN is checked to determine whether it is set. If the direction open flag is set, control is transferred via a path 1502 to a decision block 1504. In the decision block 1504, a flag LSTDIR is checked to determine which direction the throttle valve 136 was driven as a result of the last calculation. If the last direction flag LSTDIR was not set, then the current direction is different from the last direction, and control is transferred via a path 1506 to an activity block 1508. In the activity block 1508, the steps same direction counter SSDIR is set to one to indicate that there have been no previous steps in the new direction. Control is then transferred from the activity block 1508 via a path 1510 to an activity block 1512 wherein the last direction flag LSTDIR is set to the same value as the current value of the direction open flag DIROPN. Thus, the last direction flag LSTDIR will be available during the next pass through the activity block 1110 to determine whether there has been a change in direction. control is transferred from the activity block 1510 to the activity block 1500 via a path 1514.

Returning again to the decision block 1504, if the last direction flag LSTDIR is set, then the current direction and the last direction are equal, and control is transferred via a path 1516 to an activity block 1518. In the activity block 1518, the steps same direction counter SSDIR is incremented by one to indicate that the throttle valve has been stepped in the same direction by an additional step. Control is transferred from the activity block 1518 via a path 1520 to the activity block 1500.

Returning to the decision block 1482, if the direction open flag DIROPN is not set, then control is transferred via a path 1522 to a decision block 1524. In the decision block 1524, the last direction flag LSTDIR is checked to determine whether it is set. If it is set, then the last direction is not equal to the current direction, and control is transferred via a paht 1526 to the activity block 1508 wherein the steps same direction counter SSDIR is set to one. If the last direction flag LSTDIR is not set, then the current direction is the same as the previous direction, and control is transferred via a path 1528 to the activity block 1518 where the steps same direction counter SSDIR is incremented by one.

All activity in the activity block 1110 is eventually transferred to the activity block 1500 wherein the current pressure P1 is transferred to a temporary storage location P3 where it can be used in the decision block 1200 in FIG. 10a after the next pressure measurement is taken. Control is transferred from the activity block 1500 via the path 1112 to the activity block 1114 in FIG. 9.

The apparatus and method of the present invention are particularly advantageous since it is not required that the absolute value of the set pressure or the measured pressure be known. The user of the apparatus and method of the present invention need only use a pressure transducer having a range which covers the pressure which needs to be controlled within the resolution required for the process. For example, if it is desired to control the pressure from 0 to 100 torr; a pressure transducer having that range is connected to the pressure input connector and the apparatus and method of the present invention control the pressure so that the voltage on the pressure input connector 210 (FIG. 1) is substantially equal to the voltage on the analog set point connector 200. More specifically, if the analog set point connector 200 has a voltage of 4.5 volts, which is 45% of the maximum voltage of 10 volts, the apparatus and method of the present invention will control the pressure so that the voltage on the pressure input connector 210 is at 4.5 volts, thus corresponding to 45 torr. If the transducer 212 connected to the connector 210 is replaced with a transducer having a range from 0 to 10 torr, the apparatus and method of the present invention will control the pressure so that the voltage on the input connector 210 is again at 4.5 volts, which corresponds to 4.5 torr. No changes in the apparatus or the programmed method of the apparatus are required to switch pressure ranges. Thus, the apparatus and method of the present invention are completely adaptable to the pressure range in any application so long as the proper pressure transducer is provided. Thus, one apparatus and method as described herein provides proper operation over many ranges of magnitudes of input pressures.

The apparatus and the method of the present invention are also adaptable to changes within the system which it is controlling. For example, if the pump which is evacuating gas from the chamber 214 through the throttle valve 136 becomes less effective with age, the apparatus and method of the present invention continuously compensate for the changes since the ability of the system to change the pressure is continuously calculated as the second derivative. In an another example, if the chamber 214 has an input supply of gas from another source, and the rate of flow of that gas is increased, the apparatus and method of the present invention will adapt itself to the changed input flow by calculating new second derivatives as it maintains the pressure in the system. Thus, it is unnecessary for an operator of the present invention to provide any adjustments to compensate for changes in the system.

The foregoing apparatus and method have been described with regard to an analog set point provided on the connector 200. The apparatus and method of the present invention can also store digital set points within random access memory in the CPU 100 and can compare the measured pressure with one of the stored desired pressures. Since the apparatus has an RS232 connector 154, the digital set points can be provided to the CPU 100 via the RS232 connector.

Appendix A is a copy of one preferred embodiment of source code for the algorithm corresponding to the activity block in FIG. 9 and in FIGS. 10a–f. The source code is written in Intel 8031 assembly language, and is useable in an Intel P8031 microprocessor. This code is provided as an example of how the method may be implemented in a digital form. Of course, it is expected that the method may be implemented in other software forms, as well as in hardware embodiments, all of which fall within the scope of the invention as described herein and claimed.

The method of the present invention can be used to control other physical parameters, such as temperature, by connecting an appropriate transducer to the input to the apparatus of the invention and by connecting the output of the apparatus to a regulator which controls the flow of a parameter-affecting species. For example, the output of the CPU 100 can control the flow of current in a resistance element and thus control the temperature in a chamber. In this example, the current flow in the resistance element would be the parameter-affecting species corresponding to the gas flow in the preferred embodiment described herein.

The above description comprises one preferred embodiment of the invention as applied to the control of pressures. Of course, one skilled in the art will readily appreciate that the versatility and adaptability of the system makes it useable for controlling numerous types of processes and operations, such as guidance systems, chemical processing systems, and the like.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system having a means for generating flow in a fluid (which fluid has a pressure and a flow rate) and a means for regulating the pressure of the fluid by varying the rate of flow of the fluid, a method of controlling the pressure of the fluid comprising periodically repeating the following steps:

measuring the pressure of the fluid;

recording the measured pressure;

comparing the measured pressure of the fluid with a desired pressure of the fluid (wherein there is a difference between the measured pressure and the desired pressure which difference may be a positive or negative number or zero) to determine the difference between the measured pressure and the desired pressure (wherein said measured pressure is changing at a rate and the rate of change of said measured pressure is itself changing at a rate);

for each repetition of said measuring step for which there was a previous measuring step, determining the rate of change of the measured pressure since the previous measuring step;

calculating a first time required to change from the measured pressure to the desired pressure if the rate of change of the pressure remains constant;

determining the rate at which the rate of change of the pressure is changing;

calculating a second time required for the rate of change of the pressure to become zero;

comparing the first time required with the second time required;

selecting one of the options of increasing the rate of flow, decreasing the rate of flow, and maintaining the current rate of flow depending upon the results of the step of comparing the first and second time; and adjusting the means for regulating the pressure so as to vary the rate of flow in accordance with the option selected in said selecting step.

2. The method as defined in claim 1 wherein the fluid is a gas.

3. The method as defined in claim 2 wherein the means for regulating the pressure is a throttle valve.

4. The method as defined in claim 1 wherein said first time is calculated in accordance with the equation:

$$SR = \left| \frac{(PC - P1)}{S1} \right|$$

where SR is said first time, PC is the desired pressure, P1 is the measured pressure, and S1 is the determined rate of change.

5. The method as defined in claim 1 wherein said second time is calculated in accordance with the equation:

$$SN = \left| \frac{S1}{SS} \right|$$

where SN is said second time, S1 is the determined rate of change, and SS is the determined rate at which the rate of change is changing.

6. A method of controlling a physical parameter magnitude of a system by adjusting the flow of a parameter-affecting species through a regulator, comprising periodically repeating the following steps:
measuring the magnitude of the physical parameter;
recording the measured magnitude of the physical parameter;
comparing the measured magnitude of the physical parameter with a desired magnitude of the parameter (wherein there is a difference between the measured magnitude and the desired magnitude of said parameter which difference may be a positive or negative number or zero) to determine the difference between the measured magnitude and the desired magnitude (wherein said measured magnitude is changing at a rate and the rate of change of said measured magnitude is itself changing at a rate);
for each repetition of said measuring step for which there was a previous measuring step, determining the rate of change of the measured magnitude of the physical parameter since the previous measuring step;
calculating a first time required to change from the measured magnitude to the desired magnitude if the rate of change of the magnitude remains constant;
determining the rate at which the rate of change of the magnitude is changing;
calculating a second time required for the rate of change of the magnitude to become zero;
comparing the first time required with the second time required;
selecting one of the options of increasing the rate of flow of the parameter-affecting species, decreasing the rate of flow of the parameter-affecting species, and maintaining the current rate of flow of the parameter-affecting species, depending upon the results of the step of comparing the first and second times; and
adjusting the regulator so as to vary the rate of flow in accordance with the option selected in said selecting step.

7. An apparatus for controlling a physical parameter magnitude in a system comprising:
a means for measuring the magnitude of the physical parameter;
means for converting the measured magnitude to a digital representation of the measured magnitude; and
a processing means responsive to the digital representation of the measured magnitude, for periodically repeating the following steps:
recording the measured magnitude of the physical parameter;
comparing the measured magnitude of the physical parameter with a desired magnitude of the physical parameter (wherein there is a difference between said measured magnitude and said desired magnitude which difference may be a positive or negative number or zero) to determine the difference between the measured magnitude and the desired magnitude (wherein the measured magnitude is changing at a rate and the rate of change of said measured magnitude is itself changing at a rate);
determining the rate at which the measured magnitude has changed from a previously measured magnitude;
calculating a first time required to change from the measured magnitude to the desired magnitude at the calculated rate of change;
determining the rate at which the rate of change of the magnitude has changed from a previously calculated rate of change;
calculating a second time required for the rate of change of magnitude to become zero;
comparing the first time required with the second time required; and
generating output signals in response to the comparison of the first and second time required, to control a parameter-affecting species so that the magnitude of the parameter is changed in a direction which causes the difference between the first time required and the second time required to become closer to zero.

8. The apparatus as defined in claim 7, wherein the parameter is pressure and the parameter-affecting species is the flow of gas in the system.

9. The apparatus as defined in claim 8, further including a throttle valve which is connected to the output of the processing means and which opens and closes to control the flow of the gas.

10. A system for controlling a parameter magnitude so that the magnitude of the parameter is maintained within a fixed range, comprising:
means for receiving a single input signal proportional to the current magnitude of the parameter;
an output means which generates a control to a parameter-affecting device which increases and decreases the magnitude of the parameter; and
processing means for performing the steps of:
receiving said input signal;
comparing the current magnitude of the parameter corresponding to said input to a desired magnitude of the parameter;
calculating a rate of change of the parameter;
calculating a rate at which the rate of change is changing;
determining a manner in which the parameter should be altered by the parameter-affecting device in order to cause the rate of change of the parameter to be zero at the time the parameter reaches the desired magnitude; and
generating an output signal to the parameter-affecting device to alter the parameter in the determined manner.

11. A system which provides automatic adaptive control of a parameter magnitude, comprising:
means for regulating said parameter;
means for receiving an input signal proportional to a measured magnitude of said parameter, and
means for processing connected to said receiving means for:
recording a history of the measured magnitudes of said parameter;

determining a first rate at which the measured magnitudes of the parameter is changing and recording a history of the first rate;

determining a second rate at which the first rate is changing and recording a history of the second rate;

calculating a first time required for said measured magnitude to reach a desired magnitude based upon said first rate;

calculating a second time required for said first rate to become zero based upon said second rate;

comparing said first time and said time; and providing an output signal to said regulating means to change the magnitude of said parameter so that said first time and said second time are equal.

12. A system for automatically controlling a parameter magnitude comprising:

a parameter-affecting actuating means;

a means for receiving a single input signal proportional to the magnitude of the parameter; and a processing means, connected to said receiving means and to said actuating means, which records a history of the magnitudes of the parameter with respect to the operation of said actuating means while controlling the magnitude of the parameter towards a desired magnitude, and which performs calculations based upon said history to drive said actuating means so that the rate of change of said measured parameter is substantially zero when the magnitude of the parameter is substantially equal to the desired magnitude, thereby adjusting the measured parameter to the desired magnitude and maintaining the measured parameter at substantially the desired magnitude.

13. The system as defined in claim 12, wherein said parameter is a pressure of a fluid and the actuating means is a valve for adjusting the pressure of the fluid.

14. The system as defined in claim 13, wherein the fluid is a gas in a vacuum chamber.

* * * * *

UNITED STATES PATENT AND TRADEMARK OFFICE
CERTIFICATE OF CORRECTION

PATENT NO. : 4,720,807

DATED : January 19, 1988

INVENTOR(S) : Robert J. Ferran, Anthony J. Tessicini and Timothy R. Brown

It is certified that error appears in the above—identified patent and that said Letters Patent is hereby corrected as shown below:

Column 12, line 68, change "235" to --234--.

Column 13, line 63, change "765" to --756--.

Column 26, line 35, change "via a paht" to --via a path--.

Signed and Sealed this

Sixth Day of December, 1988

Attest:

DONALD J. QUIGG

Attesting Officer

Commissioner of Patents and Trademarks